(12) United States Patent
Lee et al.

(10) Patent No.: US 11,693,502 B2
(45) Date of Patent: Jul. 4, 2023

(54) DISPLAY DEVICE

(71) Applicant: SAMSUNG DISPLAY CO., LTD., Yongin-si (KR)

(72) Inventors: Hyeon Bum Lee, Yongin-si (KR); Chi Wook An, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/836,360

(22) Filed: Jun. 9, 2022

(65) Prior Publication Data

US 2023/0066997 A1 Mar. 2, 2023

(30) Foreign Application Priority Data

Aug. 24, 2021 (KR) ........................ 10-2021-0111920

(51) Int. Cl.
*G06F 3/041* (2006.01)
*G06F 3/044* (2006.01)

(52) U.S. Cl.
CPC ........ *G06F 3/0412* (2013.01); *G06F 3/04164* (2019.05); *G06F 3/0446* (2019.05); *G06F 2203/04107* (2013.01)

(58) Field of Classification Search
CPC .. G06F 3/0412; G06F 3/04164; G06F 3/0446; G06F 2203/04107
See application file for complete search history.

(56) References Cited

U.S. PATENT DOCUMENTS

| | | | |
|---|---|---|---|
| 11,011,724 B2 | 5/2021 | Lim et al. | |
| 2018/0307075 A1* | 10/2018 | Jeong | G02F 1/13338 |
| 2019/0251898 A1* | 8/2019 | Cho | H01L 25/167 |
| 2020/0219948 A1* | 7/2020 | Kim | G09G 3/3283 |
| 2021/0134906 A1 | 5/2021 | Lee et al. | |
| 2022/0122535 A1* | 4/2022 | Jung | G09G 3/3275 |
| 2022/0209203 A1* | 6/2022 | Kim | H01L 27/3218 |

FOREIGN PATENT DOCUMENTS

| KR | 10-2020-0001694 | 1/2020 |
|---|---|---|
| KR | 10-2021-0052730 | 5/2021 |

* cited by examiner

*Primary Examiner* — Peter D Mcloone
(74) *Attorney, Agent, or Firm* — F. Chau & Associates, LLC

(57) ABSTRACT

A display device including: a display panel including first and second pixels a substrate; and a touch sensor on the display panel, wherein the touch sensor includes: sensor patterns on the display panel; bridge patterns connected to the sensor patterns; a first light blocking pattern on the sensor patterns, wherein the first light blocking pattern is provided for each of the first pixels, the first light blocking pattern including a first opening corresponding to an emission area of each of the first pixels; and a second light blocking pattern located under the first light blocking pattern, wherein the second light blocking pattern is provided for each of the first pixels, the second light blocking pattern including a second opening to correspond to the emission area of each of the first pixels, and wherein the first and second light blocking patterns have the same planar shape.

20 Claims, 18 Drawing Sheets

DISPLAY DEVICE

CROSS-REFERENCE TO RELATED APPLICATION

The present application claims priority under 35 U.S.C. § 119(a) to Korean patent application 10-2021-0111920, filed on Aug. 24, 2021 in the Korean Intellectual Property Office, the disclosure of which is incorporated by reference herein in its entirety.

1. TECHNICAL FIELD

The present disclosure relates to a display device.

2. DISCUSSION OF RELATED ART

A display device is an output device for presentation of information in visual form. As interest in information display increases, display devices are being intensively used in various electronic devices such as smartphones, digital cameras, notebook computers, navigation systems and smart televisions, and research and development of display devices is being continuously conducted.

SUMMARY

Embodiments of the present disclosure provide a display device capable of stably implementing a private mode.

In accordance with an embodiment of the present disclosure, there is provided a display device including: a display panel including first pixels and second pixels, wherein the first pixels and the second pixels are provided on a substrate; and a touch sensor disposed on the display panel, wherein the touch sensor includes: sensor patterns disposed on the display panel; bridge patterns electrically connected to the sensor patterns; a first light blocking pattern disposed on the sensor patterns, wherein the first light blocking pattern is provided for each of the first pixels, the first light blocking pattern including a first opening corresponding to an emission area of each of the first pixels; and a second light blocking pattern located under the first light blocking pattern, wherein the second light blocking pattern is provided for each of the first pixels, the second light blocking pattern including a second opening to correspond to the emission area of each of the first pixels, and wherein the first light blocking pattern and the second light blocking pattern have the same planar shape on each of the first pixels.

The first light blocking pattern and the second light blocking pattern may include different materials.

The first light blocking pattern may include a black matrix, and the second light blocking pattern may include a conductive material.

The second light blocking pattern may be electrically connected to at least one sensor pattern located on the second pixels.

Each of the first pixels may include at least one first sub-pixel, wherein the first sub-pixel includes a first electrode disposed on the substrate, a pixel defining layer including an opening exposing an area of the first electrode, a first emitting layer disposed on the area of the first electrode, and a second electrode disposed on the first emitting layer, and wherein the first sub-pixel includes four emission areas.

The opening of the pixel defining layer, the first opening of the first light blocking pattern, and the second opening of the second light blocking pattern may overlap each other.

Each of the second pixels may include at least one second sub-pixel, wherein the second sub-pixel includes a third electrode disposed on the substrate, the pixel defining layer including an opening exposing an area of the third electrode, a second emitting layer disposed on the area of the third electrode, and a fourth electrode disposed on the second emitting layer, and wherein the second sub-pixel includes one emission area.

The first sub-pixel and the second sub-pixel may have different sizes.

When viewed on a plane, the four emission areas of the first sub-pixel and the one emission area of the second sub-pixel may include a rhombic shape or a circular shape.

The touch sensor may include: a base layer located on the display panel; a first conductive pattern located on the base layer; a first insulating layer disposed on the first conductive pattern and the base layer; a second conductive pattern located on the first insulating layer; a second insulating layer disposed on the second conductive pattern and the first insulating layer; and a capping layer disposed on the second insulating layer, wherein the first light blocking pattern is disposed on the capping layer.

The sensor patterns may include first sensor patterns arranged along a first direction and second sensor patterns arranged along a second direction intersecting the first direction, the bridge patterns may include first bridge patterns connecting the first sensor patterns to each other and second bridge patterns connecting the second sensor patterns to each other, and the first conductive pattern may include the first bridge patterns, and the second conductive pattern may include the first sensor patterns, the second sensor patterns, and the second bridge patterns.

The second light blocking pattern may be provided in the same layer as the first sensor patterns, the second sensor patterns, and the second bridge patterns.

The second light blocking patterns may have a width greater than that of the at least one sensor pattern located on each of the second pixels.

The touch sensor may further include a third light blocking pattern located under the second light blocking pattern, wherein the third light blocking pattern is provided for each of the first pixels, the third light blocking pattern including a third opening corresponding to the emission area of each of the first pixels.

The first light blocking pattern, the second light blocking pattern, and the third light blocking pattern may have the same planar shape on each of the first pixels.

The third light blocking pattern may include a conductive material.

The third light blocking pattern may be provided in the same layer as the first bridge patterns.

The opening of the pixel defining layer, the first opening of the first light blocking pattern, the second opening of the second light blocking pattern, and the third opening of the third light blocking pattern may overlap each other.

Each of the first sub-pixel and the second sub-pixel may include a pixel circuit layer disposed on the substrate, the pixel circuit layer including at least one transistor.

In accordance with an embodiment of the present disclosure, there is provided a display device including: a display panel including first pixels and second pixels; and a touch sensor disposed on the display panel, wherein the touch sensor includes: sensor patterns disposed on the display panel; bridge patterns electrically connected to the sensor patterns; a first light blocking pattern disposed on the sensor patterns, wherein the first light blocking pattern is provided for each of the first pixels, the first light blocking pattern including a first opening corresponding to an emission area of each of the first pixels; a second light blocking pattern overlapped by the first light blocking pattern, wherein the second light blocking pattern is provided for each of the first pixels, the second light blocking pattern including a second opening corresponding to the first opening; and a third light blocking pattern overlapped by the second light blocking pattern, wherein the third light blocking patter is provided for each of the first pixels, the third light blocking pattern including a third opening corresponding to the second opening, wherein the first light emitting pattern, the second light emitting pattern, and the third light emitting pattern have the same planar shape on each of the first pixels.

BRIEF DESCRIPTION OF THE DRAWINGS

Example embodiments of the present disclosure will now be described more fully hereinafter with reference to the accompanying drawings; however, the present disclosure may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals may refer to like elements throughout this specification.

DETAILED DESCRIPTION OF THE EMBODIMENTS

It will be understood that, although the terms "first" "second", etc. may be used herein to describe various elements, these elements should not be limited by these terms. These terms are used to distinguish one element from another element. Thus, a "first" element discussed below could also be termed a "second" element. As used herein, the singular forms are intended to include the plural forms as well, unless the context clearly indicates otherwise.

It will be further understood that the terms "includes" and/or "including", when used in this specification, specify the presence of stated features, integers, steps, operations, elements, and or components, but do not preclude the presence and/or addition of one or more other features, integers, steps, operations, elements, components, and/or groups thereof. Further, an expression that an element such as a layer, region, substrate or plate is placed "on" or "above" another element indicates not only a case where the element is placed "directly on" or "just above" the other element but also a case where a further element is interposed between the element and the other element. In addition, an expression that an element such as a layer, region, substrate or plate is placed "beneath" or "below" another element indicates not only a case where the element is placed "directly beneath" or "just below" the other element but also a case where a further element is interposed between the element and the other element.

In this specification, it will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. In addition, it will be understood that, when an element (for example, a first element) is "directly coupled with/to" or "directly connected to" another element (for example, a second element), there is no intervening element (for example, a third element) between the element and another element.

Hereinafter, example embodiments of the present disclosure will be described in detail with reference to the accompanying drawings.

Figure 1:
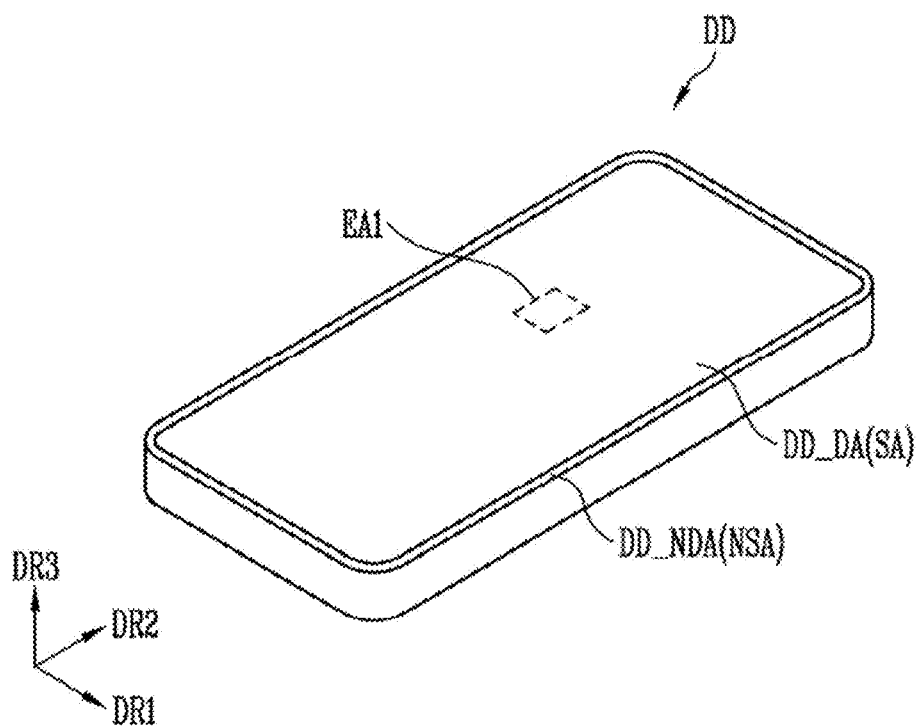
FIG. 1 is a perspective view illustrating a display device in accordance with an embodiment of the present disclosure.
Figure 2:
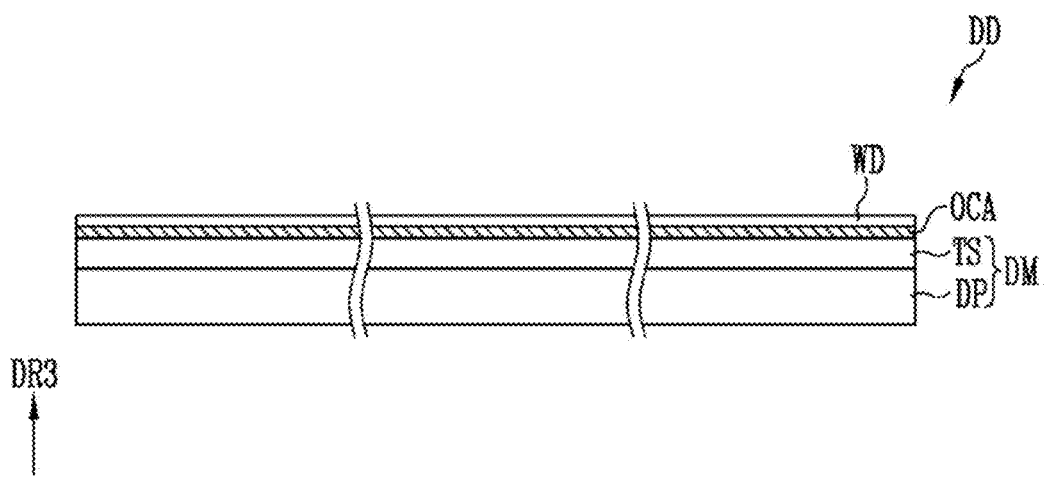
FIG. 2 is a cross-sectional view of the display device shown in FIG. 1.

FIG. 1 is a perspective view illustrating a display device DD in accordance with an embodiment of the present disclosure. FIG. 2 is a cross-sectional view of the display device DD shown in FIG. 1.

Referring to FIGS. 1 and 2, the display device DD may include a display module DM and a window WD.

The display device DD may be provided in various shapes. In an example, the display device DD may be provided in a rectangular plate shape having two pairs of sides parallel to each other, but the present disclosure is not limited thereto. When the display device DD is provided in the rectangular plate shape, any one pair of sides among the two pairs of sides may be longer than the other pair of sides. In an embodiment of the present disclosure, for convenience of description, a case where the display device DD is provided in a rectangular shape having a pair of long sides and a pair of short sides is illustrated. An extending direction of the long sides is indicated by a second direction DR2, an extending direction of the short sides is indicated by a first direction DR1, and a thickness direction of the display device DD is indicated by a third direction DR3. In some embodiments of the present disclosure, in the display device DD with the rectangular plate shape, a corner portion at which one long side and one short side are in contact with each other may have a round shape.

In an embodiment of the present disclosure, at least a portion of the display device DD may have flexibility, and the display device DD may be folded at the portion having the flexibility.

The display device DD may include a display area DD_DA in which an image is displayed and a non-display area DD_NDA provided at at least one side of the display area DD_DA. The non-display area DD_NDA is an area in which the image is not displayed.

In some embodiments of the present disclosure, the display device DD may include a sensing area SA and a non-sensing area NSA. The display device DD may not only display an image through the sensing area SA, but also sense light incident from the front of the display device DD. The non-sensing area NSA may surround the sensing area. However, this is merely illustrative, and the present disclosure is not limited thereto. Although a case where the sensing area SA has a shape including a round corner and corresponds to the display area DD_DA is illustrated in FIG. 1, the present disclosure is not limited thereto. In some embodiments of the present disclosure, a partial area of the display area DD_DA may correspond to the sensing area SA.

The shape, size, and arrangement position of the sensing area SA of the display device DD may be variously modified according to a sensor electrode (or touch electrode) which will be described later.

The display module DM may include a display panel DP and a touch sensor TS.

The touch sensor TS may be directly disposed on the display panel DP, or be disposed on the display panel DP with a separate layer such as an adhesive layer or a substrate, which is interposed therebetween.

The display panel DP may display an image. A self-luminescent display panel such as an Organic Light Emitting Display panel (OLED panel) may be used as the display panel DP. In addition, a non-self-luminescent display panel, such as a Liquid Crystal Display panel (LCD panel), an Electro-Phoretic Display panel (EPD panel), or an Electra-Wetting Display panel (EWD panel), may be used as the display panel DP. When a non-self-luminescent display panel is used as the display panel DP, the display device DD may include a backlight unit which supplies light to the display panel DP.

The touch sensor TS may be disposed on a surface from which an image of the display panel DP is emitted, to receive a touch input of a user. The touch sensor TS may recognize a touch event of the display device DD through a hand of the user or a separate input means. The touch sensor TS may recognize a touch event by using a capacitance method.

The touch sensor TS may sense a touch input by using a mutual capacitance method or sense the touch input by using a self-capacitance method.

The window WD for protecting an exposed surface of the display module DM may be provided on the display module DM. The window WD may protect the display module DM from external impact, and provide an input surface and/or a display surface to the user. The window WD may be coupled to the display module DM by using an optically clear adhesive member OCA.

The window WD may have a multi-layered structure selected from a glass substrate, a plastic film, and the plastic substrate. This multi-layered structure may be formed through a continuous process or an adhesion process using an adhesive layer. The whole or a portion of the window WD may have flexibility.

Figure 3:
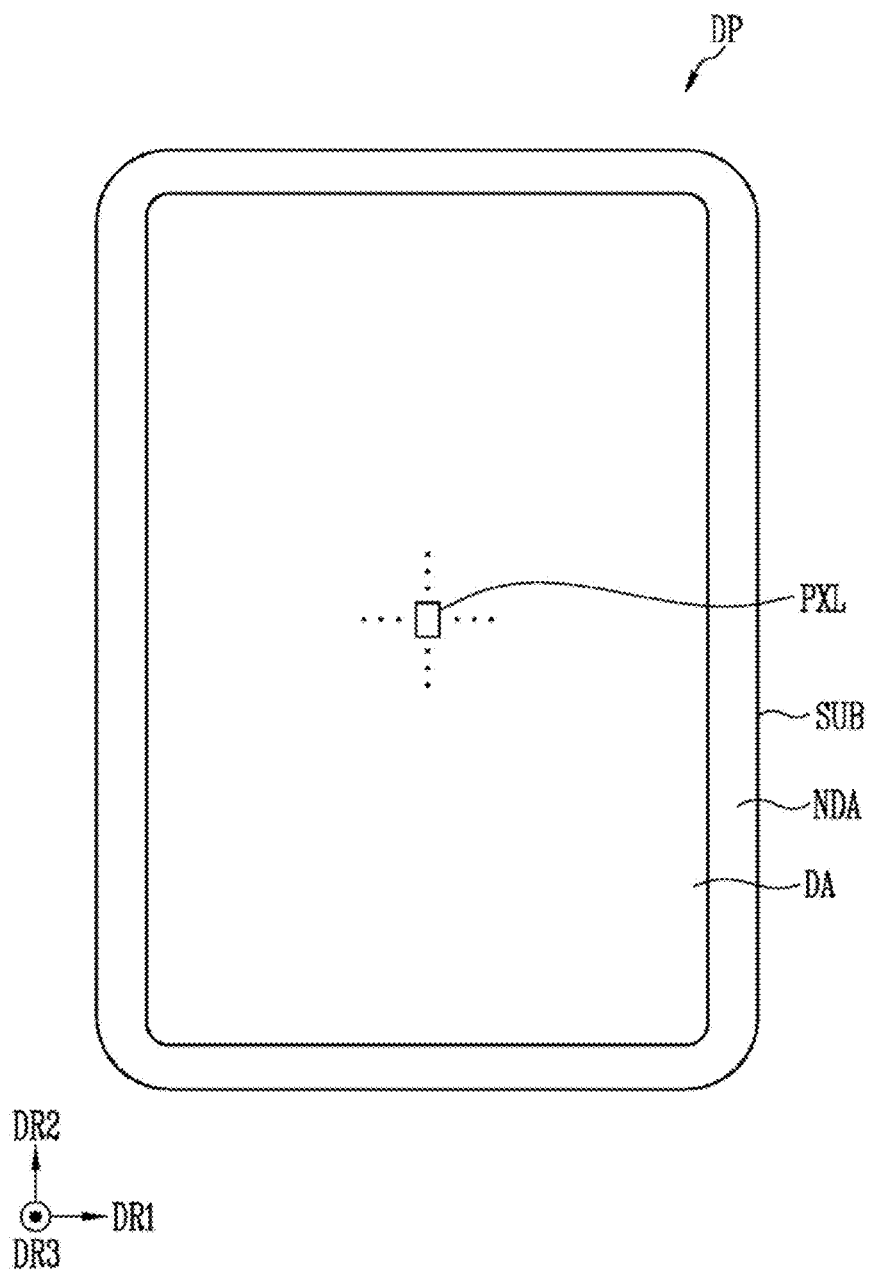
FIG. 3 is a plan view illustrating a display panel shown in FIG. 2.

FIG. 3 is a plan view illustrating the display panel DP shown in FIG. 2.

Referring to FIGS. 1 to 3, the display panel DP may include a substrate SUB, pixels PXL provided in the substrate SUB, a driver (or a driving unit) which is provided in the substrate SUB and drives the pixels PXL, and a line portion connecting the pixels PXL and the driver to each other.

The substrate SUB may be provided as one area having an approximately rectangular shape. However, the number of areas provided in the substrate SUB may be different therefrom, and the substrate SUB may have different shapes according to areas provided in the substrate SUB.

The substrate SUB may be made of an insulative material such as glass or resin. In addition, the substrate SUB may be made of a material having flexibility to be bendable or foldable, and have a single- or multi-layered structure. For example, the material having flexibility may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate. However, the material constituting the substrate SUB may be variously changed, and include a Fiber glass Reinforced Plastic (FRP), and the like.

The substrate SUB may include a display area DA and a non-display area NDA. The display area DA may be an area in which the pixels PXL are provided to display an image. The non-display area NDA is an area in which the pixels PXL are not provided, and may be an area in which the image is not displayed. For convenience of description, only one pixel PXL is illustrated in FIG. 3, but a plurality of pixels PXL may be substantially disposed in the display area DA of the substrate SUB.

The display area DA of the display panel DP may correspond to the display area DD_DA of the display device DD, and the non-display area NDA of the display panel DP may correspond to the non-display area DD_NDA of the display device DD.

The driver for driving the pixels PXL and a portion of the line portion (e.g., fan-out lines) connecting the pixels PXL and the driver to each other may be provided in the non-display area NDA. The non-display area NDA may correspond to a bezel area of the display device DD.

The pixels PXL may be provided in the display region DA of the substrate SUB. Each of the pixels PXL may be a minimum unit which displays an image. Each of the pixels PXL may include a light emitting element for emitting white light and/or colored light. Each of the pixels PXL may emit light of any one color among red, green, and blue. However, the present disclosure is not limited thereto, and each of the pixels PXL may emit light of a color such as cyan, magenta or yellow.

The pixels PXL may be arranged in a matrix form along rows extending in the first direction DR1 and columns extending in the second direction DR2 intersecting the first direction DR1. However, the arrangement form of the pixels PXL is not particularly limited, and the pixels PXL may be arranged in various forms.

The driver may provide each pixel PXL with a signal (or a predetermined signal) and a power source (or a predetermined power source) through the line portion. Accordingly, the driver can control driving of the pixel PXL.

Figure 4:
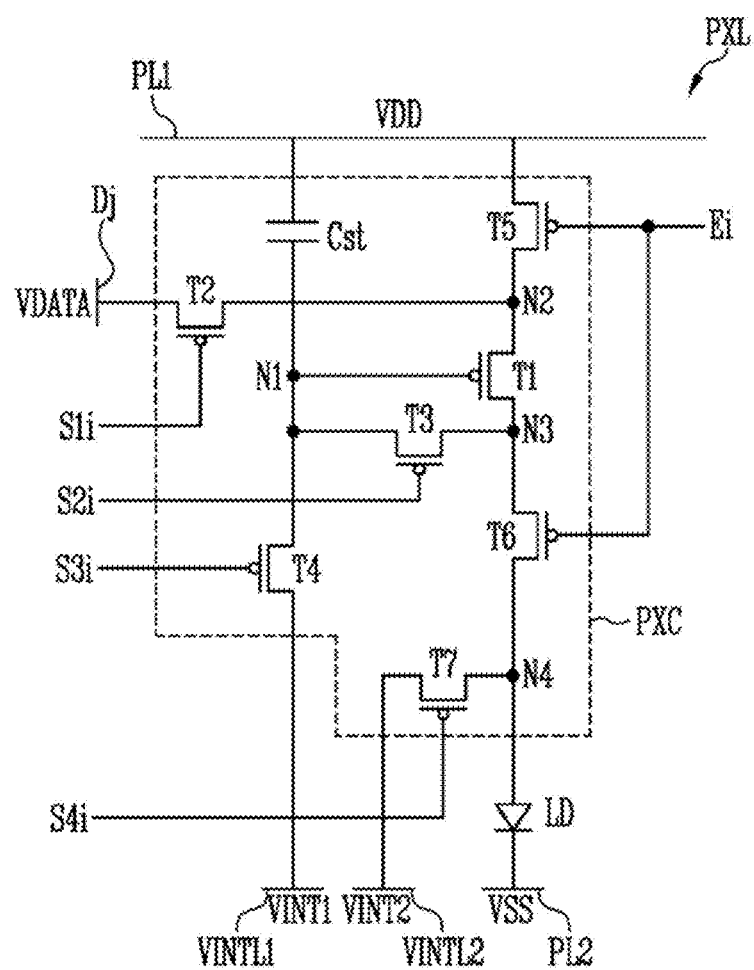
FIG. 4 is a circuit diagram illustrating an electrical connection relationship of components included in a pixel shown in FIG. 3.

FIG. 4 is a circuit diagram illustrating an electrical connection relationship of components included in a pixel PXL shown in FIG. 3.

In FIG. 4, for convenience, a pixel PXL which is located on an ith horizontal line (or ith pixel row) and is connected to a jth data line Dj will be illustrated (i and j are natural numbers).

Referring to FIGS. 1 to 4, each of the pixels PXL may include a light emitting element LD and a pixel circuit PXC for driving the light emitting element LD.

A first electrode of the light emitting element LD may be connected to a fourth node N4, and a second electrode of the light emitting element LD may be connected to a second power line PL2 (or second driving voltage line) through which a second driving voltage VSS is transferred. The light emitting element LD may generate (or emit) light (or a beam) with a luminance (or a predetermined luminance) corresponding to an amount of current (or driving current) supplied from a first transistor T1.

In an embodiment of the present disclosure, the light emitting element LD may be an organic light emitting diode including an organic emitting layer. In some embodiments of the present disclosure, the light emitting element LD may be an inorganic light emitting element formed of an inorganic material or a light emitting element configured with a combination of an inorganic material and an organic material. Alternatively, the light emitting element LD may have a form in which a plurality of inorganic light emitting elements are connected in parallel and/or series between the second power line PL2 and the fourth node N4.

A gate electrode of the first transistor T1 (or driving transistor) may be connected to a first node N1, a first electrode of the first transistor T1 may be connected to a second node N2, and a second electrode of the first transistor T1 may be connected to a third node N3.

The first transistor T1 may control an amount of current flowing from a first driving voltage VDD to the second driving voltage VSS via the light emitting element LD, corresponding to a voltage of the first node N1. To accomplish this, the first driving voltage VDD may be set as a voltage higher than the second driving voltage VSS.

A second transistor T2 (or switching transistor) may be connected between the jth data line Dj (hereinafter, referred to as a "data line") connected to the pixel PXL and the second node N2. A gate electrode of the second transistor T2 may be connected to a first scan line S1i connected to the pixel PXL. The second transistor T2 may be turned on when a scan signal is supplied to the first scan line S1i, to electrically connect the data line Dj and the second node N2 to each other.

A third transistor T3 (or compensation transistor) may be connected between the second electrode of the first transistor T1 (e.g., the third node N3) and the gate electrode of the first transistor T1 (e.g., the first node N1). A gate electrode of the third transistor T3 may be connected to a second scan line S2i. The third transistor T3 may be turned on when a scan signal is supplied to the second scan line S2i, to electrically connect the second electrode and the gate electrode of the first transistor T1 (or the first node N1 and the third node N3) to each other. In other words, a timing at which the second electrode (e.g., a drain electrode) of the first transistor T1 and the gate electrode of the first transistor T1 are connected to each other may be controlled by the scan signal. When the third transistor T3 is turned on, the first transistor T1 may be connected in a diode form.

A fourth transistor T4 (or first initialization transistor) may be connected between the first node N1 (or the gate electrode of the first transistor T1) and a first initialization voltage line VINTL1. A gate electrode of the fourth transistor T4 may be turned on in response to a scan signal supplied to a third scan line S3i, to supply a first initialization voltage VINT1 to the first node N1. The first initialization voltage VINT1 may be set as a voltage lower than a data voltage VDATA supplied to the data line Dj. Accordingly, a gate voltage of the first transistor T1 (or the voltage of the first node N1) may be initialized to the first initialization voltage VINT1 by the turn-on of the fourth transistor T4.

A fifth transistor T5 (or second emission control transistor) may be connected between a first power line PL1 (or first driving voltage line) and the second node N2. A gate electrode of the fifth transistor T5 may be connected to an ith emission control line Ei (hereinafter, referred to as an "emission control line"). The fifth transistor T5 may be turned on when an emission control signal is supplied to the emission control line Ei, and be turned off in other cases. For example, the fifth transistor T5 may be turned off when the emission control signal is not supplied to the emission control line Ei.

A sixth transistor T6 (or first emission control transistor) may be connected between the second electrode of the first transistor T1 (e.g., the third node N3) and the fourth node N4. A gate electrode of the sixth transistor T6 may be connected to the emission control line Ei. The sixth transistor T6 may be controlled substantially identically to the fifth transistor T5. In other words, the sixth transistor T6 may be turned on by the emission control signal supplied through the emission control line Ei and turned on when the emission control signal is not supplied.

The fifth transistor T5 and the sixth transistor T6 may be turned on in response to the emission control signal supplied through the emission control line Ei, and form a flow path of a driving current between the first power line PL1 and the fourth node N4 (or between the first power line PL1 and the second power line PL2).

In FIG. 4, it is illustrated that the fifth transistor T5 and the sixth transistor T6 are connected to the same emission control line Ei. However, this is merely illustrative, and the fifth transistor T5 and the sixth transistor T6 may be respectively connected to separate emission control lines to which different emission control signals are supplied.

A seventh transistor T7 (or second initialization transistor) may be connected between the fourth node N4 and a second initialization power line VINTL2. A gate electrode of the seventh transistor T7 may be connected to a fourth scan line S4i. The seventh transistor T7 may be turned on when a scan signal is supplied to the fourth scan line S4i, to supply a second initialization voltage VINT2 to the fourth node N4. The first initialization power line VINTL1 and the second initialization power line VINTL2 may be the same power line.

A storage capacitor Cst may be connected between the first power line PL1 and the first node N1. The storage capacitor Cst may store a difference voltage between the first driving voltage VDD provided through the first power line PL1 and a voltage obtained by subtracting an absolute threshold voltage of the first transistor T1 from the data voltage applied to the first node N1.

Figure 5:
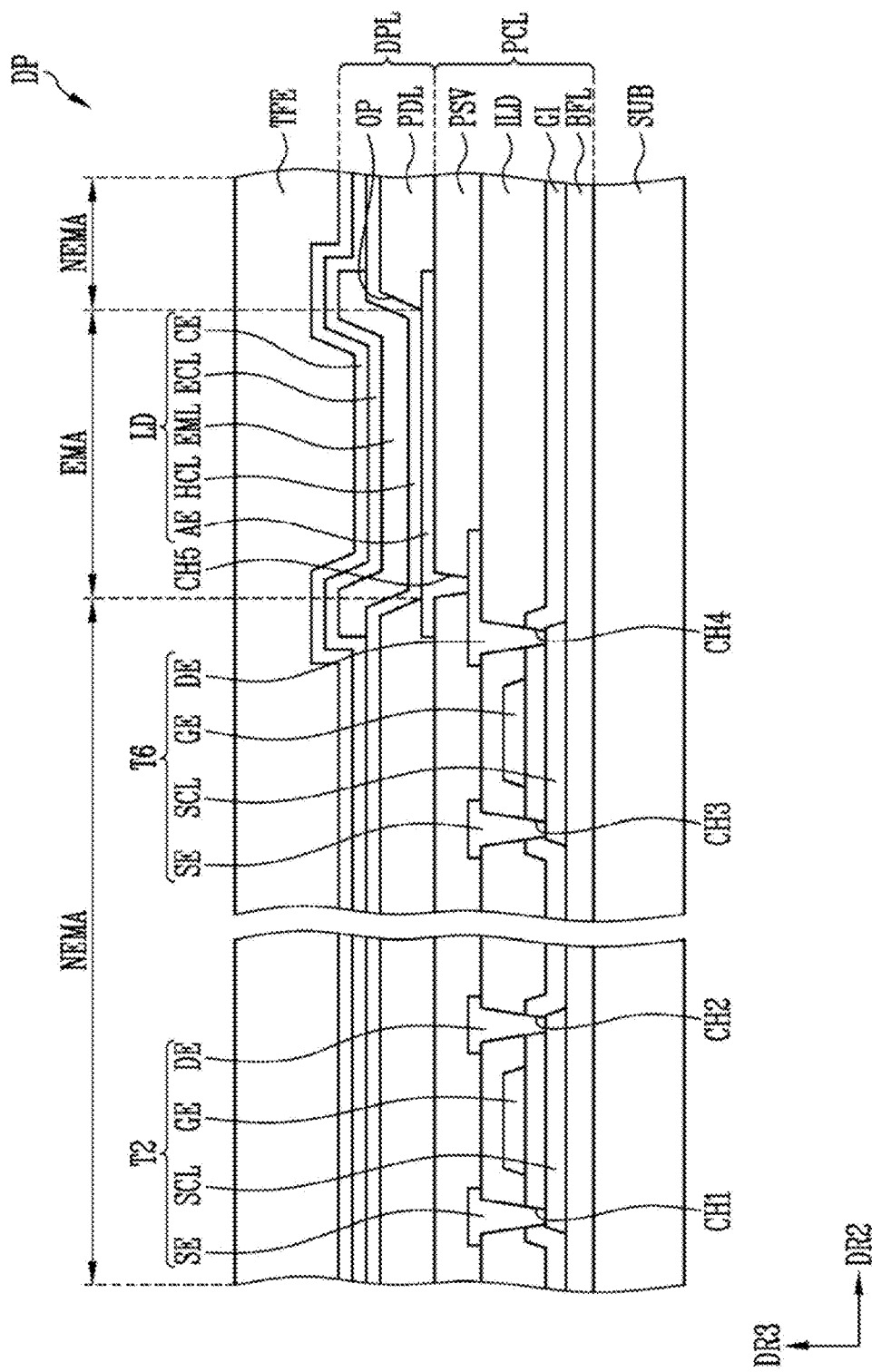
FIG. 5 is an enlarged cross-sectional view of a portion of the display panel shown in FIG. 2.

FIG. 5 is an enlarged cross-sectional view of a portion of the display panel DP shown in FIG. 2.

In FIG. 5, for convenience of description, only a section of a portion corresponding to each of the second and sixth transistors T2 and T6 among the first to seventh transistors T1 to T7 shown in FIG. 4 is illustrated.

Referring to FIGS. 1 to 5, the display panel DP may include the substrate SUB, a pixel circuit layer PCL, a display element layer DPL, and a thin film encapsulation layer TFE.

The substrate SUB may include an insulative material such as glass, organic polymer, or quartz. In addition, the substrate SUB may be made of a material having flexibility to be bendable or foldable, and have a single- or multi-layered structure.

The pixel circuit layer PCL may include a buffer layer BFL, second and sixth transistors T2 and T6, and a passivation layer PSV.

The buffer layer BFL may be disposed on the substrate SUB, and prevent an impurity from being diffused into the second and sixth transistors T2 and T6. The buffer layer BFL may be an inorganic insulating layer including an inorganic material. The buffer layer BFL may include, for example, at least one of silicon nitride ($SiN_x$), silicon oxide ($SiO_x$), silicon oxynitride ($SiO_xN_y$), and metal oxide such as aluminum oxide ($AlO_x$). The buffer layer BFL may be provided in a single layer, but may also be provided in a multi-layer including at least two layers. When the buffer layer BFL is provided in the multi-layer, the layers may be formed of the same material or be formed of different materials. The buffer layer BFL may be omitted according to the material and process conditions of the substrate SUB.

Each of the second and sixth transistors T2 and T6 may include a semiconductor layer SCL, a gate electrode GE, a source electrode SE, and a drain electrode DE.

The semiconductor layer SCL of each of the second and sixth transistors T2 and T6 may be disposed on the buffer layer BFL. The semiconductor layer SCL may include source and drain regions respectively in contact with the source electrode SE and the drain electrode DE. A region between the source region and the drain region may be a channel region. In other words, a portion of the semiconductor layer SCL between the source region and the drain region may be a channel region.

The semiconductor layer SCL may be a semiconductor pattern made of poly-silicon, amorphous silicon, an oxide semiconductor, or the like. The channel region may be an intrinsic semiconductor pattern undoped with an impurity. The impurity may include impurities such as an n-type impurity, a p-type impurity, and other metals. Each of the source and drain regions may be a semiconductor pattern doped with the impurity.

The gate electrode GE of each of the second and sixth transistors T2 and T6 may be disposed on a corresponding semiconductor layer SCL with a gate insulting layer GI interposed therebetween.

The source electrode SE of each of the second and sixth transistors T2 and T6 may be in contact with a source region of a corresponding semiconductor layer SCL through a contact hole penetrating an interlayer insulating layer ILD and the gate insulating layer GI. In an example, the source electrode SE of the second transistor T2 may be in contact with a source region of a corresponding semiconductor layer SCL through a first contact hole CH1 penetrating the interlayer insulating layer ILD and the gate insulating layer GI, and the source electrode SE of the sixth transistor T6 may be in contact with a source region of a corresponding semiconductor layer SCL through a third contact hole CH3 penetrating the interlayer insulating layer ILD and the gate insulating layer GI.

The drain electrode DE of each of the second and sixth transistors TS and T6 may be in contact with a drain region of a corresponding semiconductor layer SCL through a contact hole penetrating the interlayer insulating layer ILD and the gate insulating layer GI. In an example, the drain electrode DE of the second transistor T2 may be in contact with a drain region of a corresponding semiconductor layer SCL through a second contact hole CH2 penetrating the interlayer insulating layer ILD and the gate insulating layer GI, and the drain electrode DE of the sixth transistor T6 may be in contact with a drain region of a corresponding semiconductor layer SCL through a fourth contact hole CH4 penetrating the interlayer insulating layer ILD and the gate insulating layer GI.

In an embodiment of the present disclosure, each of the interlayer insulating layer ILD and the gate insulating layer GI may be configured as an inorganic insulting layer including an inorganic material or an organic insulating layer including an organic material.

The passivation layer PSV may be provided over the second and sixth transistors T2 and T6 to cover the second and sixth transistors T2 and T6. The passivation layer PSV may include a fifth contact hole CH5 exposing the drain electrode DE of the sixth transistor T6 to the outside. In this case, the drain electrode DE of the sixth transistor T6 may be electrically connected to another circuit element.

The display element layer DPL may include a light emitting element LD which is disposed on the passivation layer PSV and emits light.

The light emitting element LD may include first and second electrodes AE and CE, and an emitting layer EML provided between the first and second electrodes AE and CE. Any one of the first and second electrodes AE and CE may be an anode electrode, and the other of the first and second electrodes AE and CE may be a cathode electrode. For example, the first electrode AE may be the anode electrode, and the second electrode CE may be the cathode electrode. When the light emitting element LD is a top emission organic light emitting element, the first electrode AE may be a reflective electrode, and the second electrode CE may be a transmissive electrode. In an embodiment of the present disclosure, a case where the light emitting element LD is the top emission organic light emitting element, and the first electrode AE is the anode electrode is described.

The first electrode AE may be electrically connected to the drain electrode DE of the sixth transistor T6 through the fifth contact hole CH5 penetrating the passivation layer PSV. The first electrode AE may include a reflective layer capable of reflecting light and a transparent conductive layer disposed on the top or the bottom of the reflective layer. At least one of the transparent conductive layer and the reflective layer may be electrically connected to the drain electrode DE of the sixth transistor T6.

The display element layer DPL may further include a pixel defining layer DPL having an opening OP exposing a portion of the first electrode AE, e.g., a top surface of the first electrode AE.

Each pixel provided in the display panel DP may be disposed in a pixel area included in the display area DA. In an embodiment of the present disclosure, the pixel area may include an emission area EMA and a non-emission area NEMA adjacent to the emission area EMA. The non-emission area NEMA may surround the emission area EMA. In an embodiment of the present disclosure, the emission area EMA may correspond to the portion of the first electrode AE, which is exposed by the opening OP of the pixel defining layer DPL.

The display element layer DPL may include a hole control layer HCL and an electron control layer ECL.

The hole control layer HCL may be commonly disposed in the emission area EMA and the non-emission area NEMA. A common layer such as the hole control layer HCL or the electron control layer ECL may be commonly formed in a plurality of pixels PXL.

The emitting layer EML may be disposed on the hole control layer HCL. In this case, the emitting layer EML may be disposed between the hole control layer HCL and the electron control layer ECL. The emitting layer EML may be disposed in an area corresponding to the opening OP. In other words, emitting layer EML may be separately provided in each of a plurality of pixels PXL. The emitting layer EML may include an organic material and/or an inorganic material. In an embodiment of the present disclosure, the emitting layer EML may be a patterned emitting layer. However, in some embodiments of the present disclosure, the emitting layer EML may be commonly provided in the pixels PXL. The color of light generated from the emitting layer EML may be one of red, green, blue, and white, but this is not limited in the above-described embodiment. For example, the color of light generated from the emitting layer EML may be one of magenta, cyan, and yellow.

The electron control layer ECL may be disposed on the emitting layer EML. The electron control layer ECL may be commonly formed in the pixels PXL, and function to inject and/or transport electrons into and/or to the emitting layer EML.

The second electrode CE may be disposed on the electron control layer ECL. The second electrode CE may be commonly provided in the pixels PXL.

The thin film encapsulation layer TFE covering the second electrode CE may be disposed on the second electrode CE.

The thin film encapsulation layer TFE may be provided as a single layer, but may also be provided as a multi-layer. The thin film encapsulation layer TFE may include a plurality of insulating layers covering the light emitting element LD. Specifically, the thin film encapsulation layer TFE may include at least one inorganic layer and at least one organic layer. For example, the thin film encapsulation layer TFE may have a structure in which inorganic and organic layers are stacked. In some embodiments of the present disclosure, the thin film encapsulation layer TFE may be an encapsulation substrate which is disposed on the light emitting element LD and is joined with the substrate SUB through a sealant.

Figure 6:
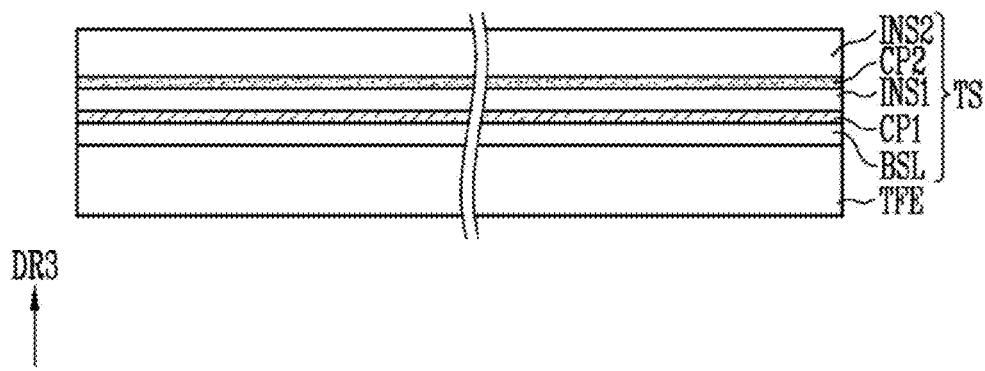
FIG. 6 is a cross-sectional view of a touch sensor shown in FIG. 2.

FIG. 6 is a cross-sectional view of the touch sensor TS shown in FIG. 2.

Referring to FIGS. 1 to 6, the touch sensor TS may include a base layer BSL, a first conductive pattern CP1, a first insulating layer INS1, a second conductive pattern CP2, a second insulating layer INS2.

The first conductive pattern CP1 may be directly disposed on the thin film encapsulation layer TFE, but the present disclosure is not limited thereto. In some embodiments of the present disclosure, another insulating layer, e.g., the base layer BSL may be disposed between the first conductive pattern CP1 and the thin film encapsulation layer TFE. The first conductive pattern CP1 may be directly disposed on the base layer BSL. In some embodiments of the present disclosure, the base layer BSL may be an uppermost layer of the thin film encapsulation layer TFE.

Each of the first and second conductive patterns CP1 and CP2 may have a single-layered structure or have a multi-layered structure n which layers are stacked in a thickness direction. The conductive pattern having the single-layered structure may include a metal layer or a transparent conductive layer. The metal layer may include molybdenum, silver, titanium, copper, aluminum, and alloys thereof. The transparent conductive layer may include a transparent conductive oxide such as indium tin oxide (ITO), indium zinc oxide (IZO), zinc oxide (ZnO), or indium tin zinc oxide (ITZO). In addition, the transparent conductive layer may include PEDOT, metal nano wires, and graphene.

The conductive pattern having the multi-layered structure may include a plurality of metal layers. The plurality of metal layers may have, for example, a triple structure of titanium/aluminum/titanium. The conductive pattern having the multi-layered structure may include a single metal layer and a transparent conductive layer. The conductive pattern having the multi-layered structure may include a plurality of metal layers and a transparent conductive layer.

In an embodiment of the present disclosure, each of the first and second conductive patterns CP1 and CP2 may include sensor patterns constituting a touch electrode and sensing lines.

Each of the first insulating layer INS1 and the second insulating layer INS2 may include an inorganic insulating layer including an inorganic material or an organic insulating layer including an organic material.

The inorganic insulating layer may include an inorganic insulating layer such as silicon oxide ($SiO_x$), silicon nitride ($SiN_x$), silicon oxynitride ($SiO_xN_y$), aluminum oxide ($Al_xO_y$), titanium oxide ($TiO_x$), tantalum oxide ($Ta_xO_y$), hafnium oxide ($HfO_2$), or zinc oxide ($ZnO_x$). The zinc oxide ($ZnO_x$) may be zinc oxide (ZnO) and/or zinc peroxide ($ZnO_2$).

The organic insulating layer may include at least one of acryl-based resin, methacryl-based resin, polyisoprene, vinyl-based resin, epoxy-based resin, urethane-based resin, cellulose-based resin, siloxane-based resin, polyimide-based resin, polyimide-based resin, and perylene-based resin.

A capping layer or protecting the second insulating layer INS2 may be provided and/or formed on the second insulating layer INS2.

Figure 7:
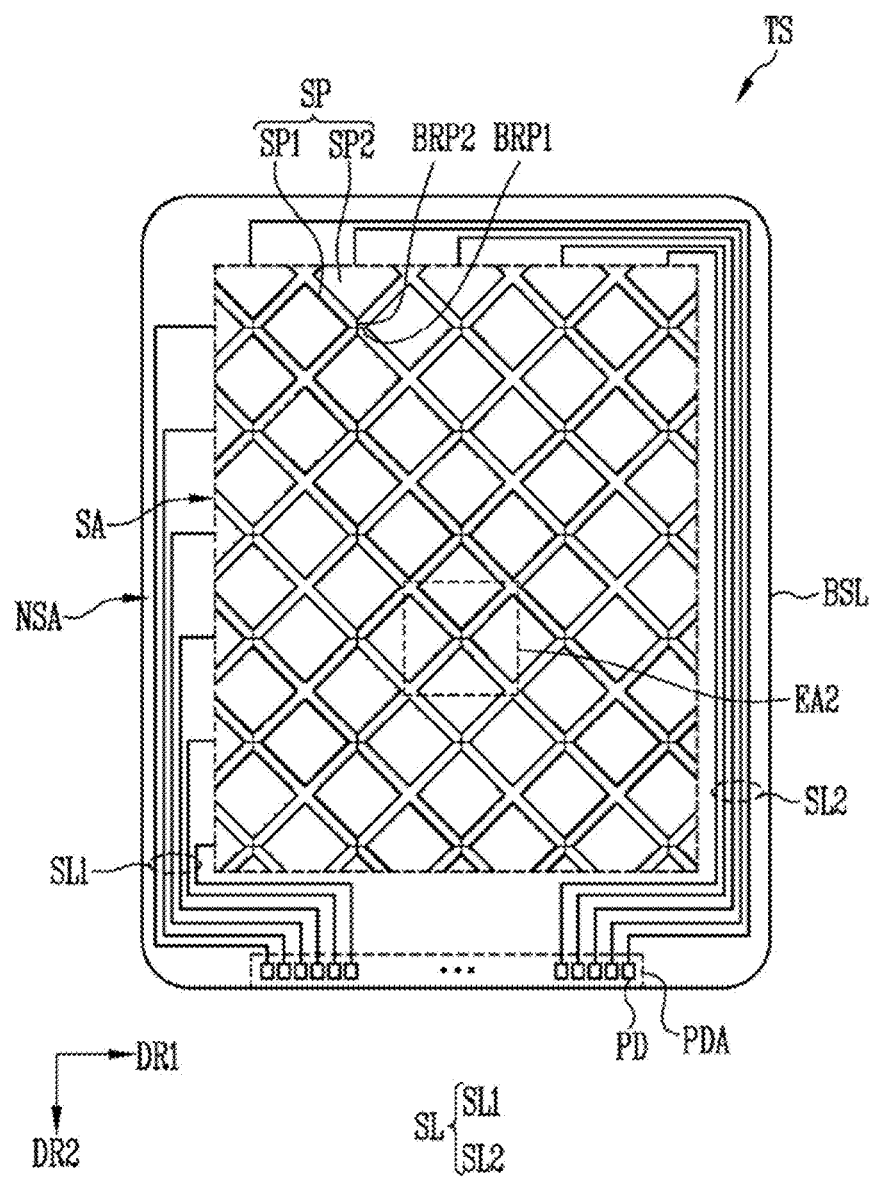
FIG. 7 is a plan view of the touch sensor shown in FIG. 2.
Figure 8:
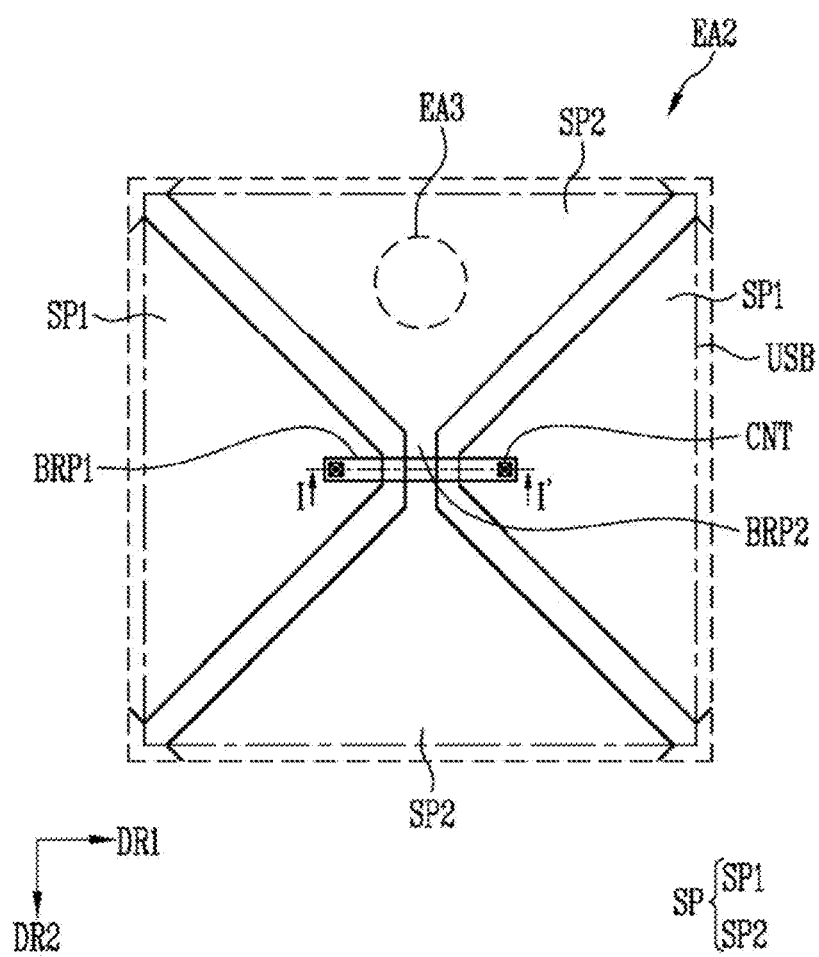
FIG. 8 is an enlarged view of portion EA2 shown in FIG. 7.
Figure 9:
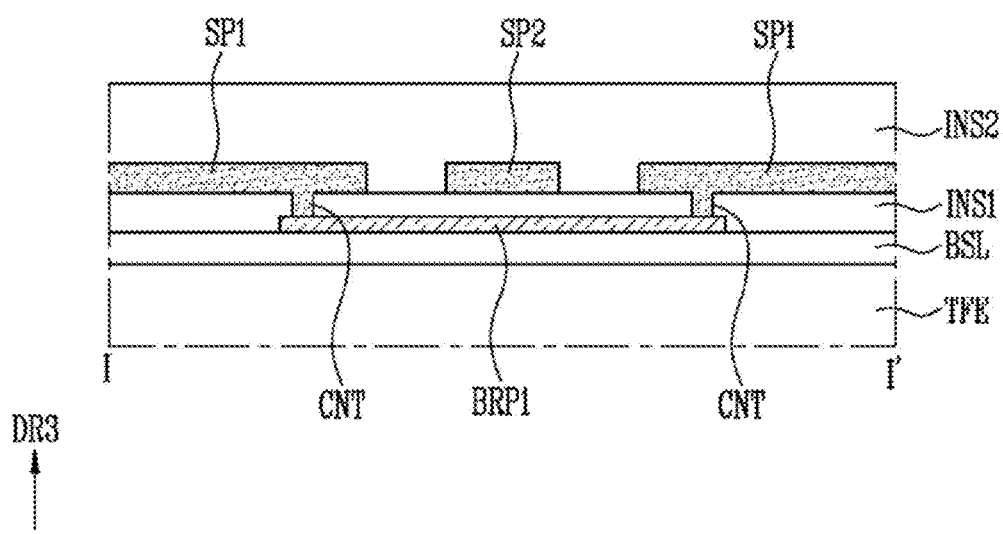
FIG. 9 is a cross-sectional view taken along line I-I' shown in FIG. 8.
Figure 10:
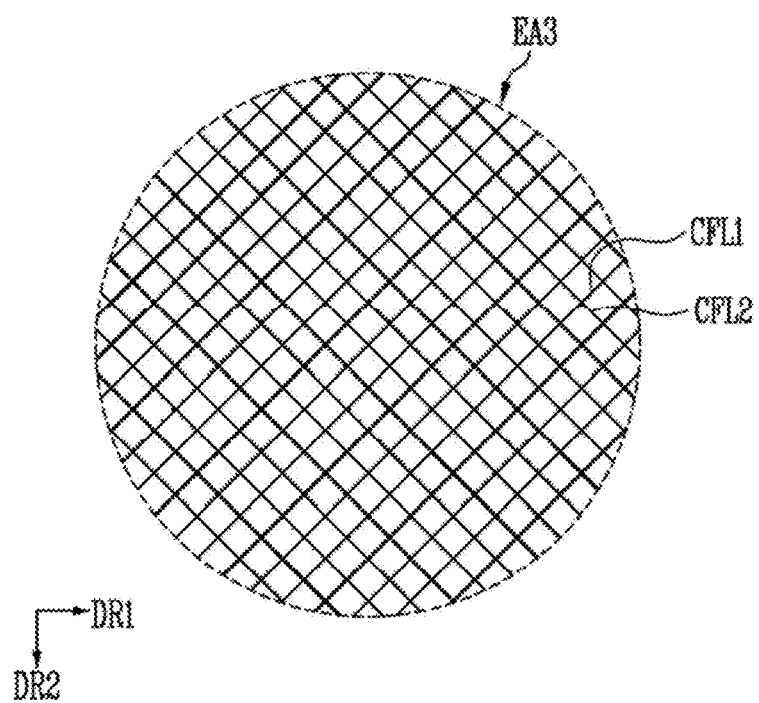
FIG. 10 is an enlarged view of portion EA3 shown in FIG. 8.

FIG. 7 is a plan view of the touch sensor TS shown in FIG. 2. FIG. 8 is an enlarged view of portion EA2 shown in FIG. 7. FIG. 9 is a cross-sectional view taken along line I-I' shown in FIG. 8. FIG. 10 is an enlarged view of portion EA3 shown in FIG. 8.

In FIGS. 7 to 10, for convenience of description, a lateral direction (or horizontal direction) on a plane is indicated by a first direction DR1, a longitudinal direction (or vertical direction) on a plane is indicated by a second direction DR2, and a thickness direction of a substrate SUB on a section is indicated by a third direction DR3.

Referring to FIGS. 1 to 10, the touch sensor TS may include a base layer BSL including a sensing area SA capable of sensing a touch input and a non-sensing area NSA surrounding at least a portion of the sensing area SA.

The base layer BSL may be made of tempered glass, transparent plastic, a transparent film, or the like.

The sensing area SA may be provided in a central area of the base layer BSL to overlap the display area DA of the display panel DP. The sensing area SA may be provided in a shape substantially identical to that of the display area DA, but the present disclosure is not limited thereto. A sensor electrode (or touch electrode) for sensing a touch input may be provided and/or formed in the sensing area SA.

The non-sensing area NSA may be provided at an edge of the base layer BSL to overlap the non-display area NDA of the display panel DP. Sensing lines SL electrically connected to the sensor electrode (or touch electrode) to receive and transfer a touch sensing signal may be provided and/or formed in the non-sensing area NSA. In addition, a pad portion PDA connected to the sensing lines SL to be electrically connected to the sensor electrode of the sensing area SA may be disposed in the non-sensing area NDA. The pad portion PDA may include a plurality of pads PD.

The sensor electrode may include a plurality of sensor patterns SP and first and second bridge patterns BRP1 and BRP2.

The sensor patterns SP may include a plurality of first sensor patterns SP1 and a plurality of second sensor patterns SP2 electrically insulated from the first sensor patterns SP1.

First sensor patterns SP1 may be arranged in the first direction DR1, and be electrically connected to adjacent first sensor patterns SP1 through first bridge patterns BRP1, to constitute at least one sensor row. Second sensor patterns SP2 may be arranged in the second direction DR2 intersecting the first direction DR1, and be electrically connected to adjacent second sensor patterns SP2 through second bridge patterns BRP2, to constitute at least one sensor column. The second bridge patterns BRP2 may be integrally formed with adjacent second sensor patterns SP2.

Each of the first and second sensor patterns SP1 and SP2 may be electrically connected to one pad PD through a corresponding sensing line SL.

In an embodiment of the present disclosure, the touch sensor TS may sense a variation in mutual capacitance formed between the first and second sensor patterns SP1 and SP2, thereby recognizing a touch of a user.

In an embodiment of the present disclosure, each second sensor pattern SP2 may include a plurality of conductive fine lines CFL1 and CFL2 as shown in FIG. 10. In an example, the second sensor patterns SP2 may include a plurality of conductive fine lines CFL1 which extend in an oblique direction of the first direction DR1 and are parallel to each other and a plurality of second conductive fine lines CFL2 which extend in an oblique direction of the second direction DR2 and are parallel to each other. Due to the first conductive fine lines CFL1 and the second conductive fine lines CFL2, each of the second sensor patterns SP2 may have a mesh structure. The mesh structure may include a plurality of openings, e.g., areas formed when the first conductive fine lines CFL1 and the second conductive fine lines CFL2 intersect each other.

Although a case where each of the second sensor patterns SP2 has a mesh structure, the present disclosure is not limited thereto. For example, the first sensor patterns SP1 and the first and second bridge patterns BRP1 and BRP2 may also be provided in a mesh structure including the first and second conductive fine lines CFL1 and CFL2.

When the first and second sensor patterns SP1 and SP2 have a mesh structure, the area with which the first and second sensor patterns SP1 and SP2 overlap the display area DP may be decreased by the openings of the mesh structure. Electromagnetic interference between the first and second sensor patterns SP1 and SP2 and the display panel DP can be prevented.

Each of the first bridge patterns BRP1 is used to electrically connect first sensor patterns SP1 arranged in parallel along the first direction DR1 to each other. Each first bridge pattern BRP1 may also be provided in a shape extending along the first direction DR1. Each first bridge pattern BRP1 may be formed separately from the first sensor patterns SP1 and be connected to adjacent first sensor patterns SP1 through contact holes.

Each of the second bridge patterns BRP2 is used to electrically connect second sensor patterns SP2 arranged in parallel along the second direction DR2 to each other. Each second bridge pattern BRP2 may also be provided in a shape extending along the second direction DR2. In an embodiment of the present disclosure, each second bridge pattern BRP2 may be integral with the second sensor patterns SP2.

The touch sensor TS may include a first conductive pattern (see "CP1" shown in FIG. 6) disposed on the base layer BSL, a first insulating layer INS1 disposed on the first conductive pattern CP1, a second conductive pattern (see "CP2" shown in FIG. 6) disposed on the first insulating layer INS1, and a second insulating layer INS2 disposed on the second conductive pattern CP2.

The base layer BSL may be disposed on the thin film encapsulation layer TFE of the display panel DP.

In some embodiments of the present disclosure, the base layer BSL may be the uppermost layer of the thin film encapsulation layer TFE of the display panel DP. For example, the base layer BSL may be an inorganic insulating layer (or inorganic layer) as the uppermost layer of the thin film encapsulation layer TFE. In some embodiments of the present disclosure, the base layer BSL may be an inorganic insulating layer (or inorganic buffer layer) additionally disposed on the thin film encapsulation layer TFE. The inorganic insulating layer may include at least one material selected from materials constituting the first and second insulating layers INS1 and INS2.

The first conductive pattern CP1 may be directly disposed on the base layer BSL. The first conductive pattern CP1 may include first bridge patterns BRP1 as shown in FIG. 9.

The first conductive pattern CP1 may include a conductive material. The conductive material may include a transparent conductive oxide or a metal material. In addition, the first conductive pattern CP1 may include a plurality of stacked metal layers. Examples of the transparent conductive oxide may be indium tin oxide (ITO), indium zinc oxide (IZO), antimony zinc oxide (AZO), indium tin zinc oxide (ITZO), zinc oxide ($ZnO_x$), tin oxide ($SnO_x$), and the like. Examples of the metal material may be copper, silver, gold, platinum, palladium, nickel, tin, aluminum, cobalt, rhodium, iridium, iron, ruthenium, osmium, manganese, molybdenum, tungsten, niobium, tantalum, titanium, bismuth, antimony, lead, and the like. The first conductive pattern CP1 may include a single-layered structure or have a multi-layered structure.

The first insulating layer INS1 may be disposed on the first conductive pattern CP1. The first insulating layer INS1 may be in direct contact with the first conductive pattern CP1. In an embodiment of the present disclosure, the first insulating layer INS1 may include an organic insulating layer including an organic material or an inorganic insulating layer including an organic material.

Like the first conductive pattern CP1, the second conductive pattern CP2 may include a single conductive material layer or include a plurality of stacked conductive material layers. The second conductive pattern CP2 may include first and second sensor patterns SP1 and SP2 and second bridge patterns BRP2, which are disposed on the first insulating layer INS1, as shown in FIG. 9. First sensor patterns SP1 adjacent to each other in the first direction DR1 may be electrically and/or physically connected to each other by the first bridge patterns BRP1 through contact holes CNT penetrating the first insulating layer INS1. The first bridge patterns BRP1 may be overlapped by the second sensor patterns SP2.

The second insulating layer INS2 may be disposed on the first insulating layer INS1 on which the second conductive pattern CP2 is provided. The second insulating layer INS2 may prevent the second conductive pattern CP2 from being exposed to the outside, thereby preventing corrosion of the second conductive pattern CP2. The second insulating layer INS2 may be provided as an organic insulating layer configured with an organic material. The organic material may include one of acryl, polyimide (PI), polyimide (PA), and benzocyclobutene (BCB). Since the second insulating layer INS2 provided as the organic insulating layer is transparent and has flexibility, the second insulating layer INS2 reduces bending of a lower structure, thereby planarizing the lower structure. In some embodiments of the present disclosure, the second insulating layer INS2 may be provided as an inorganic insulating layer including an inorganic material.

In an embodiment of the present disclosure, although a case where the first bridge patterns BRP1 are included in the first conductive pattern CP1, and the first and second sensor patterns SP1 and SP2 and the second bridge patterns BRP2 are included in the second conductive pattern CP2 has been described as an example, the present disclosure is not limited thereto. In some embodiments of the present disclosure, the first and second sensor patterns SP1 and SP2 and the second bridge patterns BRP2 may be included in the first conductive pattern CP1, and the first bridge patterns BRP1 may be included in the second conductive pattern CP2.

In addition, in an embodiment of the present disclosure, although a case where the first conductive pattern CP1 is disposed on the base layer BSL and the second conductive pattern CP2 is disposed on the first insulating layer INS1 has been described as an example, the present disclosure is not limited thereto. In some embodiments of the present disclosure, the first conductive pattern CP1 may be disposed on the first insulating layer INS1, and the second conductive pattern CP2 may be disposed on the base layer BSL.

In addition, in an embodiment of the present disclosure, although a case where the first and second sensor patterns SP1 and SP2 are disposed on the same layer has been described an example, the present disclosure is not limited thereto. In some embodiments of the present disclosure, the first sensor patterns SP1 and the second sensor patterns SP2 may be provided in different layers.

The sensor electrode (or touch electrode) provided and/or formed in the sensing area SA may include dummy electrodes disposed between the first and second sensor patterns SP1 and SP2 to be spaced apart from each other. The dummy electrodes are floating electrodes, and may not be electrically connected to the first sensor patterns SP1 and the second sensor patterns SP2. The dummy electrodes are disposed in the sensing area SA, so that a boundary area between the first sensor patterns SP1 and the second sensor patterns SP2 cannot be viewed. Further, a fringe effect between the first sensor patterns SP1 and the second sensor patterns SP2 can be controlled by adjusting the width and thickness of the dummy electrodes, and a capacitance between the first sensor patterns SP1 and the second sensor patterns SP2 can be optimized.

The touch sensor TS may be provided through repetitive arrangement of a unit sensor block USB as shown in FIG. 8. The unit sensor block USB is a virtual unit block having an area (or a predetermined area), which includes at least some of adjacent first sensor patterns SP1 and at least some of adjacent second sensor patterns SP2, and it may be understood that the unit sensor block USB corresponds to a minimum repetition unit of the arrangement pattern of first and second sensor patterns SP1 and SP2.

In an embodiment of the present disclosure, the sensing lines SL may include a plurality of first sensing lines SL1 and a plurality of second sensing lines SL2.

The first sensing lines SL1 may be connected to the first sensor patterns SP1. Each first sensing line SL1 may be connected to one sensor row formed by a plurality of first sensor patterns SP1 disposed along the first direction DR1. For example, the first sensing lines SL1 may be connected to the first sensor patterns SP1 at the left side of the touch sensor TS in FIG. 7.

The second sensing lines SL2 may be connected to the second sensor patterns SP2. Each second sensing line SL2 may be connected to one sensor column formed by a plurality of second sensor patterns SP2 disposed along the second direction DR2. For example, the second sensing lines SL2 may be connected to the second sensor patterns SP1 at the top side of the touch sensor TS in FIG. 7.

The first and second sensing lines SL1 and SL2 may include the same material as the first and second sensor patterns SP1 and SP2 or include a material substantially similar to that of the first and second sensor patterns SP1 and SP2. Alternatively, the first and second sensing lines SL1 and SL2 may include at least one material selected from materials constituting the first and second sensor patterns SP1 and SP2.

Each of the first sensor patterns SP1 may be applied with a driving signal for touch sensing through a corresponding first sensing line SL1, and each of the second sensor patterns SP2 may transfer a touch sensing signal through a corresponding second sensing line SL2. However, the present disclosure is not limited thereto. For example, each of the first sensor patterns SP1 may transfer a touch sensing signal through a corresponding first sensing line SL1, and each of the second sensor patterns SP2 may be applied with a driving signal for touch sensing through a corresponding second sensing line SL2.

Figure 11:
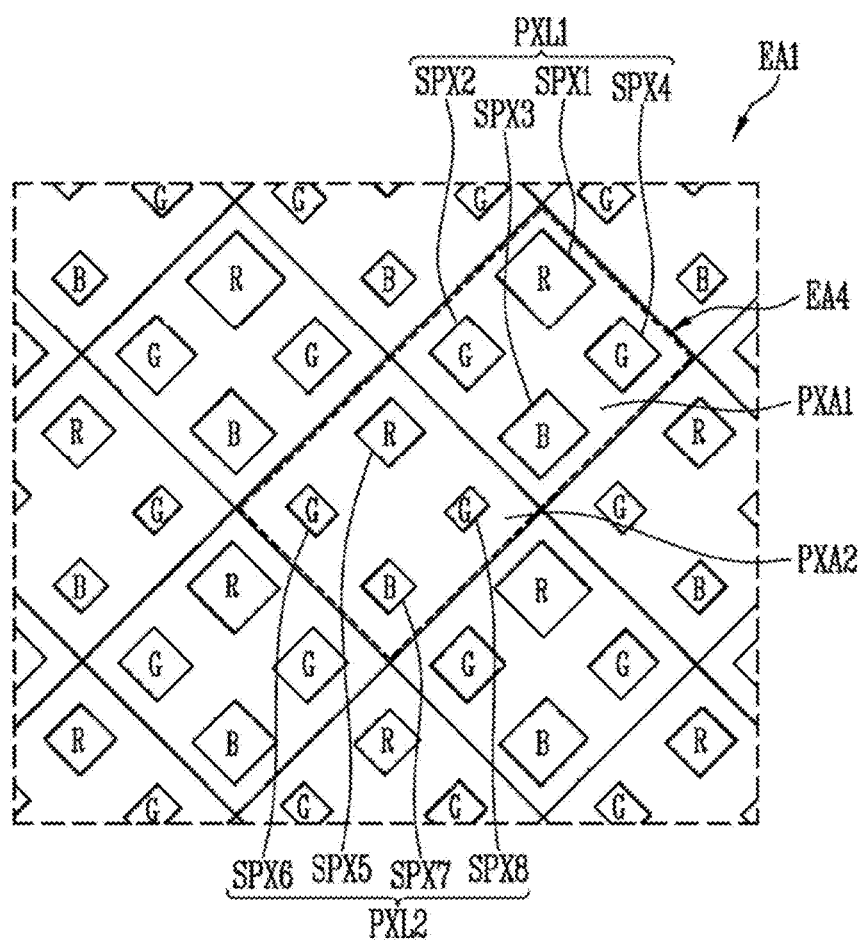
FIG. 11 is an enlarged view of portion EA1 shown in FIG. 1.

FIG. 11 is an enlarged view of portion EA1 shown in FIG. 1.

Referring to FIGS. 1 to 11, the display device DD (or the display panel DP) may include pixels PXL disposed in the display area DA. Each of the pixels PXL may be disposed in a pixel area PXA provided in the display area DA.

In an embodiment of the present disclosure, the pixels PXL may include a plurality of first pixels PXL1 and a plurality of second pixels PXL2.

Each first pixel PXL1 and each second pixel PXL2 may emit light (or a beam) at different viewing angles. In an example, each of the first pixels PXL1 may emit light at a first viewing angle, and each of the second pixels PXL2 may emit light at a second viewing angle greater than the first viewing angle. Each first pixel PXL1 may have an emission area that has an area (or size) smaller than that of an emission area of each second pixel PXL2.

The second pixels PXL2 emitting light at the second viewing angle may be driven together with the first pixels PXL1 in a normal mode, and may not be driven in a private mode. In the private mode, only the first pixels PXL1 having a viewing angle narrower than that of the second pixels PXL2 may be driven to provide image information to only a user such that the image information is not leaked to a third person. In other words, in the private mode, the first pixels PXL1 are driven such that the image generated thereby may not be observed by a person other than the user.

Each first pixel PXL1 may be disposed in a first pixel area PXA1 of the display area DA of the display panel DP (or the substrate SUB). Each first pixel PXL1 may include at least one sub-pixel. In an example, each first pixel PXL1 may include first, second, third, and fourth sub-pixels SPX1, SPX2, SPX3, and SPX4.

The first sub-pixel SPX1 may be a red sub-pixel for emitting red light R, the second and fourth sub-pixels SPX2 and SPX4 may be green sub-pixels for emitting green light G, and the third sub-pixel SPX may be a blue sub-pixel for emitting blue light B. In the emission area of each first pixel PXL1, light obtained by combining the lights emitted from the first to fourth sub-pixels SPX1 to SPX4 may be emitted.

In each first pixel area PXA1, the first and third sub-pixels SPX1 and SPX3 may be disposed adjacent to each other along the same column direction, the second sub-pixel SPX2 may be located on a column different from that on which the first and third sub-pixels SPX1 and SPX3 are disposed, and the fourth sub-pixel SPX4 may be located on another column different from that on which the first and third sub-pixels SPX1 and SPX3 are disposed.

In each first pixel area PXA, the first and third sub-pixels SPX1 and SPX3 may be disposed adjacent to each other along a vertical direction (or longitudinal direction), and the second and fourth sub-pixels SPX2 and SPX4 may be disposed adjacent to each other along a horizontal direction (or lateral direction).

The first, second, third, and fourth sub-pixels SPX1, SPX2, SPX3, and SPX4 may have an emission area with a rhombic shape, and be formed to have areas equal or similar to each other. However, the present disclosure is not limited thereto. In some embodiments of the present disclosure, the first, second, third, and fourth sub-pixels SPX1, SPX2, SPX3, and SPX4 may have different structures, and some of the first, second, third, and fourth sub-pixels SPX1, SPX2, SPX3, and SPX4 have an emission area that has an area (or size) smaller or greater than that of the other sub-pixels. In FIG. 11, for convenience, it has been illustrated that each of the first and third sub-pixels SPX1 and SPX3 (or the emission area of each of the first and third sub-pixels SPX1 and SPX3) has an area (or size) greater than that of each of the second and fourth sub-pixels SPX2 and SPX4 (or the emission area of each of the second and fourth sub-pixels SPX2 and SPX4). However, the present disclosure is not limited thereto. For example, the second sub-pixel SPX2 may be larger than the first sub-pixel SPX1.

Each of the first, second, third, and fourth sub-pixels SPX1, SPX2, SPX3, and SPX4 may include a pixel circuit including a light emitting element for emitting light and at least one transistor for driving the light emitting element. The first, second, third, and fourth sub-pixels SPX1, SPX2, SPX3, and SPX4 may include pixel circuits having structures substantially identical or similar to each other.

Each second pixel PXL2 may be disposed a second pixel area PXA2 of the display area DA of the display panel DP (or the substrate SUB). Each second pixel PXL2 may include at least one sub-pixel. In an example, each second pixel PXL2 may include fifth, sixth, seventh, and eighth sub-pixels SPX5, SPX6, SPX7, and SPX8.

The fifth sub-pixel SPX5 may be a red sub-pixel for emitting red light R, the sixth and eighth sub-pixels SPX6 and SPX8 may be green sub-pixels for emitting green light G, and the seventh sub-pixel SPX7 may be a blue sub-pixel for emitting blue light B. In the emission area of each second pixel PXL2, the light obtained by combining lights emitted from the fifth to eighth sub-pixels SPX5 to SPX8 may be emitted.

In each second pixel area PXA2, the fifth and seventh pixels SPX5 and SPX7 may be disposed adjacent to each other along the same column direction, the sixth sub-pixel SPX6 may be located on a column different from that on which the fifth and seventh sub-pixels SPX5 and SPX7 are disposed, and the eighth sub-pixel SPX8 may be located on another column different from that on which the fifth and seventh sub-pixels SPX5 and SPX7 are disposed.

In each second pixel area PXA2, the fifth and seventh sub-pixels SPX5 and SPX7 may be disposed adjacent to each other along a vertical direction (or longitudinal direction), and the sixth and eighth sub-pixels SPX6 and SPX8 may be disposed adjacent to each other along a horizontal direction (or lateral direction).

The fifth, sixth, seventh, and eighth sub-pixels SPX5, SPX6, SPX7, and SPX8 may have an emission area with a rhombic shape, and be formed to have areas (or sizes) equal or similar to each other. However, the present disclosure is not limited thereto. In some embodiments of the present disclosure, the fifth, sixth, seventh, and eighth sub-pixels SPX5, SPX6, SPX7, and SPX8 may have different structures, and some of the fifth, sixth, seventh, and eighth sub-pixels SPX5, SPX6, SPX7, and SPX8 have an emission area that is an area (or size) smaller or greater than that of the other sub-pixels. In FIG. 11, it has been illustrated that each of the fifth and seventh sub-pixels SPX5 and SPX7 (or the emission area of each of the fifth and seventh sub-pixels SPX5 and SPX7) has an area (or size) greater than that of each of the sixth and eighth sub-pixels SPX6 and SPX8 (or the emission area of each of the sixth and eighth sub-pixels SPX6 and SPX8). However, the present disclosure is not limited thereto.

Each of the fifth, sixth, seventh, and eighth sub-pixels SPX5, SPX6, SPX7, and SPX8 may include a pixel circuit including a light emitting element for emitting light and at least one transistor for driving the light emitting element. The fifth, sixth, seventh, and eighth sub-pixels SPX5, SPX6, SPX7, and SPX8 may include pixel circuits having structures substantially identical or similar to each other.

Figure 12A:
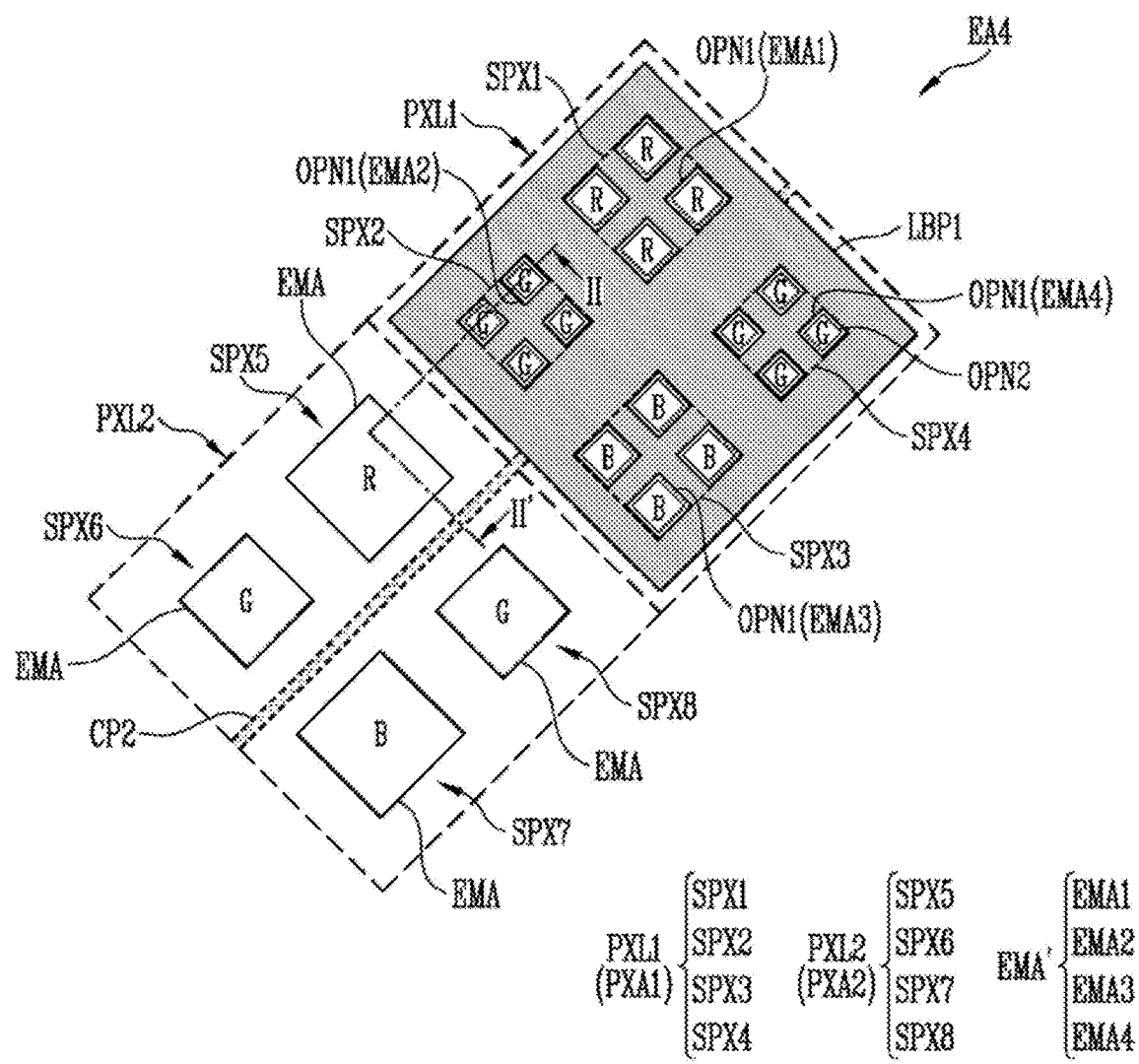
FIGS. 12A and 12B are enlarged views of portion EA4 shown in FIG. 11.
Figure 12B:
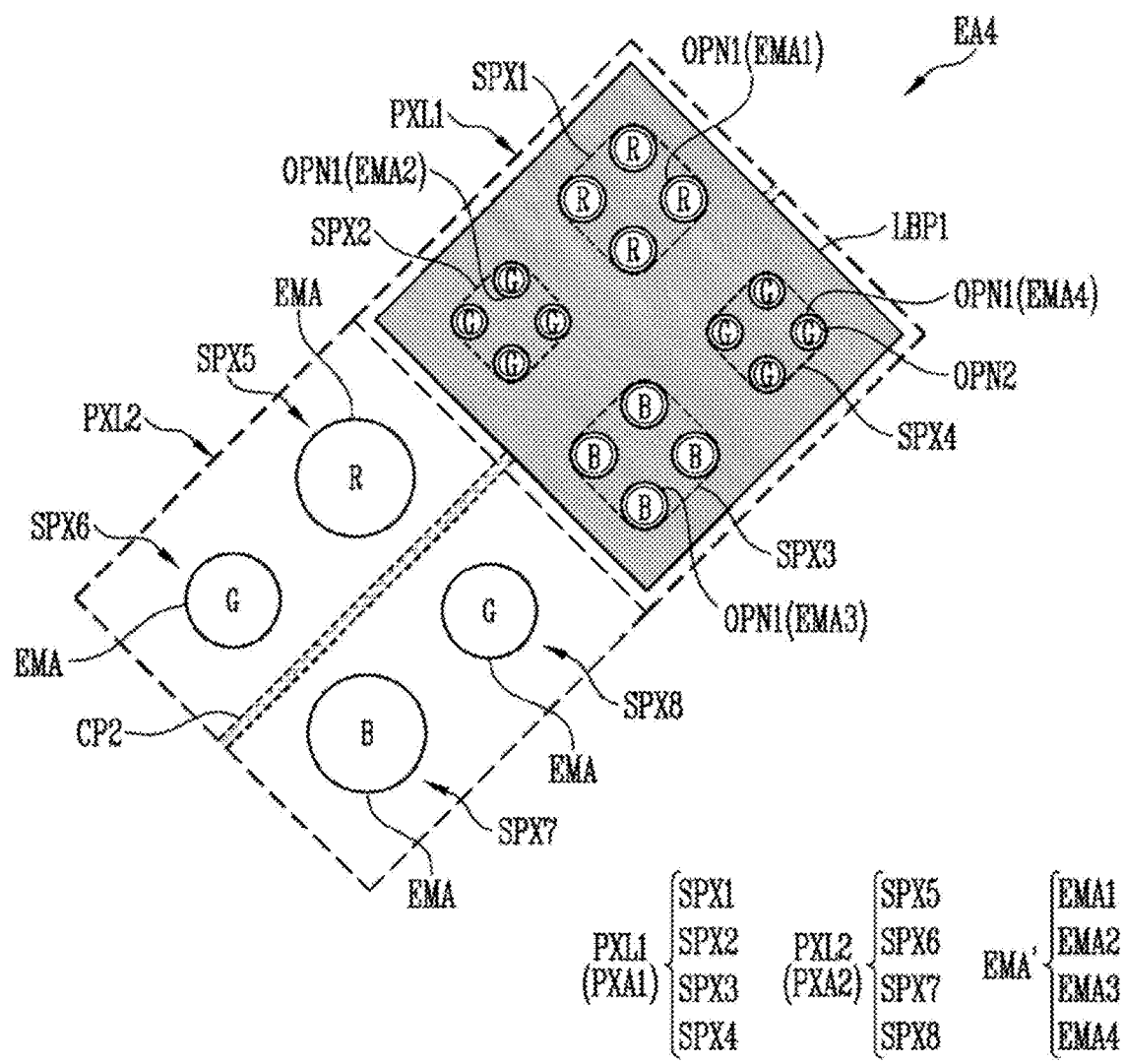
Figure 13:
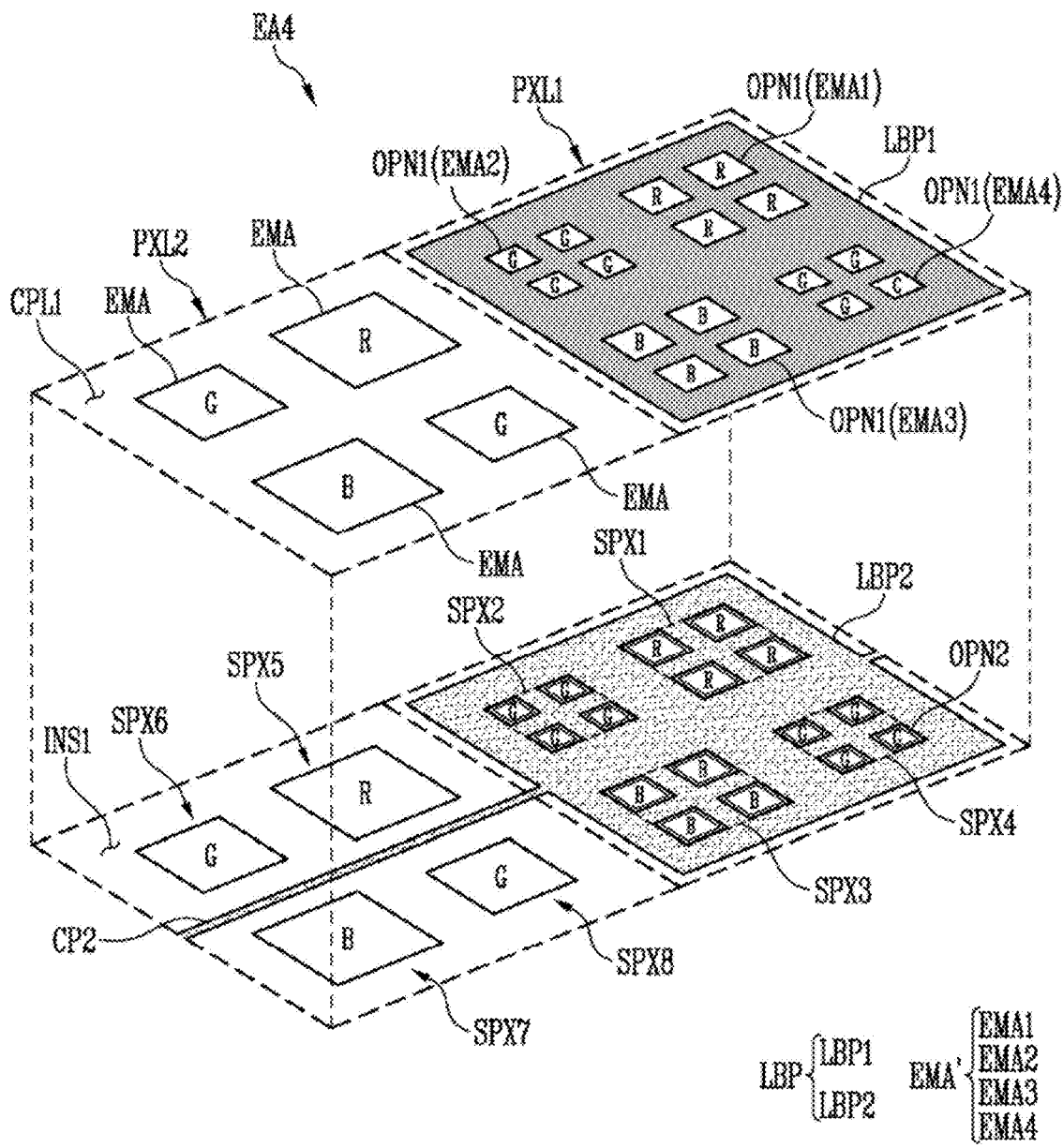
FIG. 13 is a perspective view of the portion EA4 shown in FIG. 12A.
Figure 14:
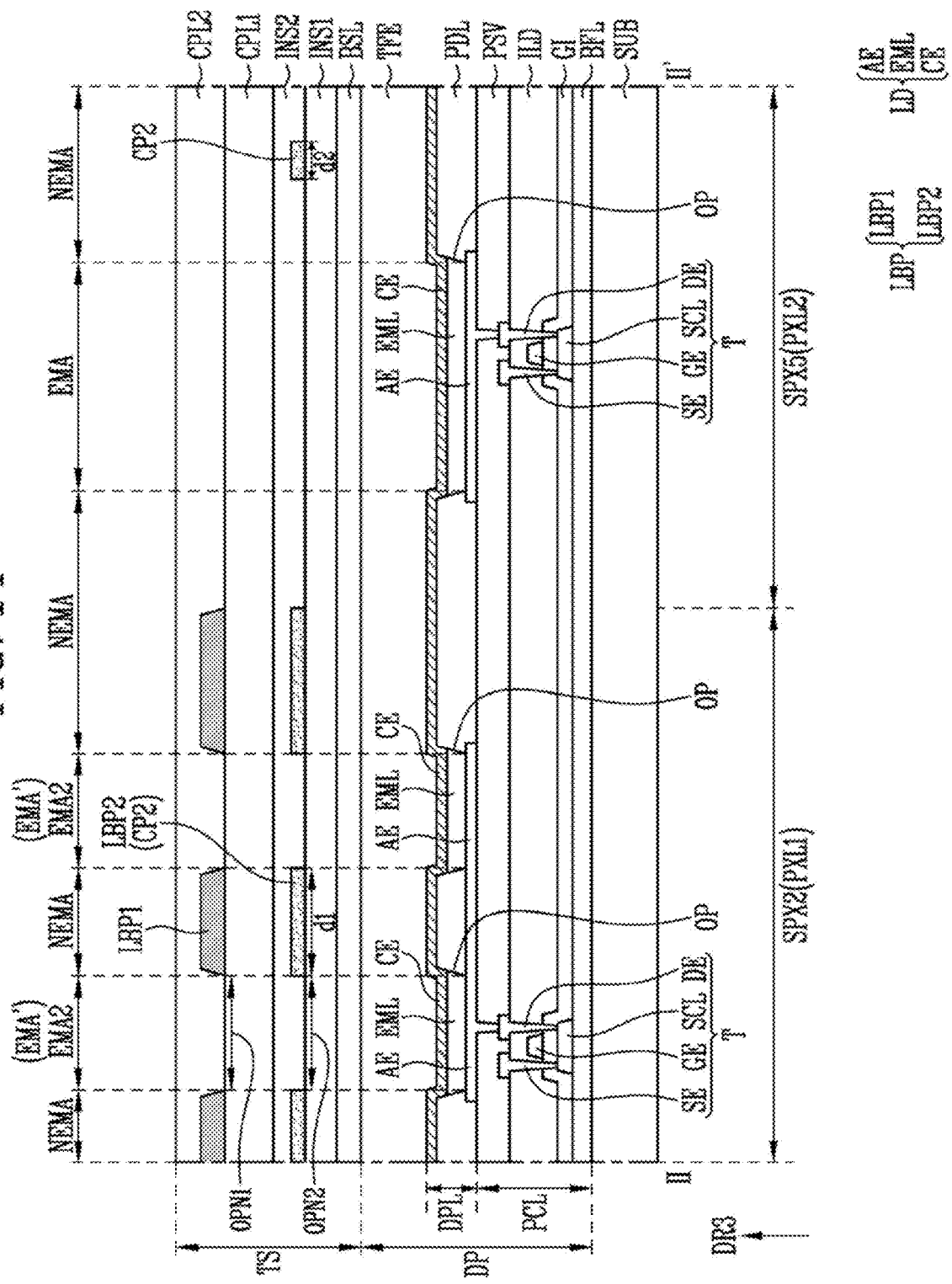
FIG. 14 is a cross-sectional view taken along line II-II' shown in FIG. 12A.

FIGS. 12A and 12B are enlarged views of portion EA4 shown in FIG. 11. FIG. 13 is a perspective view of the portion EA4 shown in FIG. 12A, FIG. 14 is a cross-sectional view taken along line II-II' shown in FIG. 12A.

In relation to first and second pixels PXL1 and PXL2 shown in FIGS. 12A to 14, portions different from those of the above-described embodiment will be mainly described to avoid redundancy.

For convenience, a thickness direction of a substrate is indicated by the third direction DR3.

Referring to FIGS. 1 to 14, each of the first pixel PXL1 and the second pixel PXL2 may include four sub-pixels. In an example, the first pixel PXL1 may include first, second, third, and fourth sub-pixels SPX1, SPX2, SPX3, and SPX4, and the second pixel PXL2 may include fifth, sixth, seventh, and eighth sub-pixels SPX5, SPX6, SPX7, and SPX8.

Each of the fifth, sixth, seventh, and eighth sub-pixels SPX5, SPX6, SPX7, and SPX8 included in the second pixel PXL2 may include an emission area EMA in which light is emitted and a non-emission area NEMA in which the light is not emitted.

Each of the fifth, sixth, seventh, and eighth sub-pixels SPX5, SPX6, SPX7, and SPX8 may include a pixel circuit layer PCL provided and/or formed on the substrate SUB and a display element layer DPL provided and/or formed on the pixel circuit layer PCL. The fifth to eighth sub-pixels SPX5 to SPXS may have structures substantially similar or identical to each other. For convenience, the fifth sub-pixel SPX5 among the fifth to eighth sub-pixels SPX5 to SPX8 will be representatively described.

The fifth sub-pixel SPX5 may include a pixel circuit layer PCL which is disposed on the substrate SUB and includes a pixel circuit PXC having at least one transistor T, a display element layer DPL disposed on the pixel circuit layer PCL, and a thin film encapsulation layer TFE. In FIG. 14, for convenience of description, only one transistor T electrically connected to a light emitting element LD is illustrated. The transistor T shown in FIG. 14 may be the sixth transistor T6 described with reference to FIGS. 4 and 5.

The pixel circuit layer PCL may include the transistor T and at least one insulating layer (film). The insulating layer may include a buffer layer BFL, a gate insulating layer GI, an interlayer insulating layer ILD, and a passivation layer PSV, which are sequentially stacked on the substrate SUB. The buffer layer BFL, the gate insulating layer GI, the interlayer insulating layer ILD, and the passivation layer PSV may be identical to the buffer layer BFL, the gate insulating layer GI, the interlayer insulating layer ILD, and the passivation layer PSV, which are described with reference to FIG. 5.

The transistor T may include a semiconductor layer SCL, a gate electrode GE, and first and second terminals SE and DE, and may be provided as a thin film transistor having the same structure as the second and sixth transistors T2 and T6 shown in FIG. 5.

The display element layer DPL of the fifth sub-pixel SPX5 may include a light emitting element LD and a pixel defining layer PDL. The light emitting element LD may include a first electrode AE (or third electrode), an emitting layer EML (or second emitting layer), and a second electrode CE (or fourth electrode). The emitting layer EML may emit red light R.

An emission area EMA of the fifth sub-pixel SPX5 is an area in which red light R is emitted, and may be defined (or partitioned) to correspond to one area of the first electrode AE or the emitting layer EML, which is exposed by an opening OP of the pixel defining layer PDL.

The thin film encapsulation layer TFE may be provided and/or formed on the display element layer DPL.

The emission area EMA of each of the fifth to eighth sub-pixels SPX5, SPX6, SPX7, and SPX8 may be provided in a polygonal shape (e.g., a rhombic shape) as shown in FIG. 12A, but the present disclosure is not limited thereto. In some embodiments of the present disclosure, the emission area EMA of each of the fifth to eighth sub-pixels SPX5, SPX6, SPX7, and SPX8 may be provided in a circular shape as shown in FIG. 12B.

Each of the first, second, third, and fourth sub-pixels SPX1, SPX2, SPX3, and SPX4 may include an emission area EMA' in which light is emitted and a non-emission area NEMA in which the light is not emitted. The emission area EMA' and the emission area EMA of each of the fifth to eighth sub-pixels SPX5 to SPX8 may have the same shape, but the present disclosure is not limited thereto.

Each of the first to fourth sub-pixels SPX1 to SPX4 included in the first pixel PXL1 may include a pixel circuit layer PCL provided and/or formed on the substrate SUB and a display element layer DPL provided and/or formed on the pixel circuit layer PCL. The first to fourth sub-pixels SPX1 to SPX4 may have structures substantially similar or identical to each other. For convenience, the second sub-pixel SPX2 among the first to fourth sub-pixels SPX1 to SPX4 will be representatively described.

The second sub-pixel SPX2 may include a pixel circuit layer PCL which is disposed on the substrate SUB and includes a pixel circuit PXC having at least one transistor T, a display element layer DPL disposed on the pixel circuit layer PCL, and a thin film encapsulation layer TFE. The pixel circuit layer PCL is substantially identical to the pixel circuit layer PCL of the fifth sub-pixel SPX5, and therefore, its detailed descriptions will be omitted.

The display element layer DPL of the second sub-pixel SPX2 may include a light emitting element LD and a pixel defining layer PDL. The light emitting element LD may include a first electrode AE, an emitting layer EML (or first emitting layer), and a second electrode CE. The emitting layer EML may emit green light G.

An emission area EMA' of the second sub-pixel SPX2 is an area in which green light G is emitted, and may be defined (or partitioned) to correspond to one area of the first electrode AE or the emitting layer EML, which is exposed by an opening OP of the pixel defining layer PDL.

The thin film encapsulation layer TFE may be provided and/or formed on the display element layer DPL.

A touch sensor TS may be provided and/or formed on the thin film encapsulation layer TFE of each of the first and second pixels PXL1 and PXL2.

The touch sensor TS may include sensor patterns SP, bridge patterns BRP, and first and second insulating layers INS1 and INS2, which are disposed on the thin film encapsulation layer TFE. In addition, the touch sensor TS may include a capping layer located on the second insulating layer INS2. The capping layer may include a first capping layer CPL1 located on the second insulating layer INS2 and a second capping layer CPL2 located on the first capping layer CPL1.

The first capping layer CPL1 may cover the first insulating layer INS1 while being located on the first insulating layer INS1, thereby protecting the first insulating layer INS1. The first capping layer CPL1 may be an inorganic insulating layer including an inorganic material or an organic insulating layer including an organic material. The first capping layer CPL1 may be selectively provided.

The second capping layer CPL2 may be entirely provided and/or formed on the first capping layer CPL1. The second capping layer CPL2 may be an organic layer entirely provided in the sensing area SA (or the display area DA), and be cured through a curing process to be used as a window member of the display device DD.

A first light blocking pattern LBP1 may be disposed between a first capping layer CPL1 and a second capping layer CPL2 of the first pixel PXL1.

In an embodiment of the present disclosure, the first light blocking pattern LBP1 is not disposed in the second pixel PXL2. In other words, the first light blocking pattern LBP1 may only be disposed on the first pixel PXL1. In an example, the first light blocking pattern LBP1 may be located on one surface of the first capping layer CPL1 to correspond to the pixel defining layer PDL of the first pixel PXL1. In other words, the first light blocking pattern LBP1 may overlap the pixel defining layer PDL in the first pixel PXL1. The first light blocking pattern LBP1 may include a light blocking material for preventing a light leakage defect in which light (or a beam) is leaked between adjacent sub-pixels. In an example, the first light blocking pattern LBP1 may include a black matrix.

The first light blocking pattern LBP1 may be partially opened to include at least one first opening OPN1 corresponding to one area of the emission area EMR' in the first pixel area PXA1. In an example, the first light blocking pattern LBP1 may include a plurality of first openings OPN1. The first openings OPN1 may correspond to the opening OP of the pixel defining layer PDL of the first pixel PXL1. The first light blocking pattern LBP1 may have a mesh shape (or grid shape) including the first openings OPN1 in the first pixel area PXA1.

In an embodiment of the present disclosure, the first openings OPN1 may define the emission area EMA' of each of the first to fourth sub-pixels SPX1 to SPX4.

The first light blocking pattern LBP1 may allow a portion of light emitted from each of the first to fourth sub-pixels SPX1 to SPX4 to be selectively transmitted therethrough such that a viewing angle of each first pixel PXL1 becomes narrower than that of each second pixel PXL2, thereby implementing the private mode.

In an embodiment of the present disclosure, a second light blocking pattern LBP2 may be located under the first light blocking pattern LBP1. In an example, the second light blocking pattern LBP2 may be located on the first insulating layer INS1 of the first pixel PXL1, and correspond to the first light blocking pattern LBP1. The second light blocking pattern LBP2 is not disposed in the second pixel PXL2. In other words, the second light blocking pattern LBP2 may only be disposed on the first pixel PXL1. In an example, the second light blocking pattern LBP2 may be located on one surface of the first insulating layer INS1 to correspond to the pixel defining layer PDL of the first pixel PXL1. Accordingly, the pixel defining layer PDL, the first light blocking pattern LBP1, and the second light blocking pattern LBP2 may correspond to each other.

The second light blocking pattern LBP2 may reflect or shield (or block) light emitted in an area between adjacent sub-pixels. To accomplish this, the second light blocking pattern LBP2 may include a conductive material having a constant reflexibility. The second light blocking pattern LBP2 may include at least one reflective electrode layer. In addition, the second light blocking pattern LBP2 may selectively further include at least one of at least one transparent electrode layer disposed on the top and/or the bottom of the reflective electrode layer and at least one conductive capping layer covering the top of the reflective electrode layer and/or the transparent electrode layer.

In some embodiments of the present disclosure, the second light blocking pattern LBP2 may be configured as a second conductive pattern CP2. The second light blocking pattern LBP2 may be provided in the same layer as the second conductive pattern CP2 (e.g., a sensor pattern SP or a second bridge pattern BRP2) located on the first insulating layer INS1 of the second pixel PXL2. The second light blocking pattern LBP2 may be connected to the second conductive pattern CP2 located on the first insulating layer INS1 of the second pixel PXL2 while being in direct contact with the second conductive pattern CP2. The second light blocking pattern. LBP2 may be used as a touch electrode which recognizes a touch of a user, and simultaneously, be used as a light control member which narrows the viewing angle of the first pixel PXL1 by blocking a portion of light emitted from each of the first to fourth sub-pixels SPX1 to SPX4 and allowing the other light to advance in only a specific direction.

The second light blocking pattern LBP2 may be partially opened to include at least one second opening OP2 corresponding to one area of the emission area EMA' in the first pixel area PXA1. In an example, the second light blocking pattern LBP2 may include a plurality of second openings OPN2. The second openings OPN2 may correspond to the opening OP of the pixel defining layer PDL of the first pixel PXL1. In addition, the second openings OPN2 may correspond to the first openings OPN1 of the first light blocking pattern LBP1. The second opening OPN2 may be the same size as the first opening OPN1. The second light blocking pattern LBP2 may have a mesh shape (or grid shape) including the second openings OPN2 in the first pixel area PXA1.

In an embodiment of the present disclosure, the second light blocking pattern LBP2 may have a width (e.g., a critical dimension (CD), 'a line width of each electrode or a width of a gap between electrodes') different from that of the second conductive pattern CP2 of the second pixel PXL2. In an example, a width d1 of the second light blocking pattern LBP2 located between two second openings OPN2 may be greater than a width d2 of the second conductive pattern CP2 of the second pixel PXL2.

In the above-described embodiment, the first light blocking pattern LBP1 and the second light blocking pattern LBP2 may have the same planar shape in the first pixel area PXA1 or have planar shapes substantially similar to each other in the first pixel area PXA1.

The second light blocking pattern LBP2 along with the first light blocking pattern LBP1 may constitute a light blocking pattern LBP which allows the viewing angle of the first pixel PXL1 to become narrow.

In an embodiment of the present disclosure, each of the first to fourth pixels SPX1 to SPX4 included in the first pixel PXL1 may include four emission areas EMA1, EMA2, EMA3, and EMA4 defined by the first and second light blocking patterns LBP1 and LBP2. In an example, the first sub-pixel SPX1 may include four first emission areas EMA1 defined by the first and second light blocking patterns LBP1 and LBP2, the second sub-pixel SPX2 may include four second emission areas EMA2 defined by the first and second light blocking patterns LBP1 and LBP2, the third sub-pixel SPX3 may include four third emission areas EMA3 defined by the first and second light blocking patterns LBP1 and LBP2, and the fourth sub-pixel SPX4 may include four fourth emission areas EMA4 defined by the first and second light blocking patterns LBP1 and LBP2.

The four first emission areas EMA1 may constitute an emission area EMA' of the first sub-pixel SPX1, the four second emission areas EMA2 may constitute an emission area EMA' of the second sub-pixel SPX2, the four third emission areas EMA3 may constitute an emission area EMA' of the third sub-pixel SPX3, and the four fourth emission areas EMA4 may constitute an emission area EMA' of the fourth sub-pixel SPX4.

The first and second light blocking patterns LBP1 and LBP2 may be located in an area (e.g., a non-emission area NEMA) between two first emission areas EMA adjacent to each other among the four first emission areas EMA1.

The four first emission areas EMA1 may have the same size and have the same shape. In an example, the four first emission areas EMA1 may form a polygonal shape (e.g., a rhombic shape) as shown in FIG. 12A, but the present disclosure is not limited thereto. In some embodiments of the present disclosure, the four first emission areas EMA1 may form a circular shape as shown in FIG. 12B.

In an embodiment of the present disclosure, each first emission area EMA1 may correspond to the first opening OPN1 of the first light blocking pattern LBP1 located in the first sub-pixel SPX1. Accordingly, when each first emission area EMA1 has a rhombic shape, the first opening OPN1 may have a rhombic shape. When each first emission area EMA1 has a circular shape, the first opening OPN1 may have a circular shape. In addition, since the second opening OPN2 of the second light blocking pattern LBP2 corresponds to the first opening OPN1 of the first light blocking pattern LBP1, the second opening OPN2 may have a shape identical to that of the first opening ONP1.

The first and second light blocking patterns LBP1 and LBP2 may be located in an area (e.g., a non-emission area NEMA) between two second emission areas EMA2 adjacent to each other among the four second emission areas EMA2.

The four second emission areas EMA2 may have the same size and have the same shape. In an example, the four second emission areas EMA2 may form a polygonal shape (e.g., a rhombic shape) as shown in FIG. 12A or form a circular shape as shown in FIG. 12B.

In an embodiment of the present disclosure, each second emission area EMA2 may correspond to the first opening OPN1 of the first light blocking pattern LBP1 located in the second sub-pixel SPX2. Accordingly, when each second emission area EMA2 has a rhombic shape, the first opening OPN1 may have a rhombic shape. When each second emission area EMA2 has a circular shape, the first opening OPN1 may have a circular shape. In addition, since the second opening OPN2 of the second light blocking pattern LBP2 corresponds to the first opening OPN1 of the first light blocking pattern LBP1, the second opening OPN2 may have a shape identical to that of the first opening OPN1.

The first and second light blocking patterns LBP1 and LBP2 may be located in an area (e.g., a non-emission area NEMA) between two third emission areas EMA3 adjacent to each other among the four third emission areas EMA3.

The four third emission areas EMA3 may have the same size and have the same shape. In an example, the four third emission areas EMA3 may form a polygonal shape (e.g., a rhombic shape) as shown in FIG. 12A or form a circular shape as shown in FIG. 12B.

In an embodiment of the present disclosure, each third emission area EMA3 may correspond to the first opening OPN1 of the first light blocking pattern LBP1 located in the third sub-pixel SPX3. Accordingly, when each third emission area EMA3 has a rhombic shape, the first opening OPN1 may have a rhombic shape. When each third emission area EMA3 has a circular shape, the first opening OPN1 may have a circular shape. In addition, since the second opening OPN2 of the second light blocking pattern LBP2 corresponds to the first opening OPN1 of the first light blocking pattern LBP1, the second opening OPN2 may have a shape identical to that of the first opening OPN1.

The first and second light blocking patterns LBP1 and LBP2 may be located in an area (e.g., a non-emission area NEMA) between two fourth emission areas EMA4 adjacent to each other among the four fourth emission areas EMA4.

The four fourth emission areas EMA4 may have the same size and have the same shape. In an example, the four fourth emission areas EMA4 may form a polygonal shape (e.g., a rhombic shape) as shown in FIG. 12A or form a circular shape as shown in FIG. 12B.

In an embodiment of the present disclosure, each fourth emission area EMA4 may correspond to the first opening OPN1 of the first light blocking pattern LBP1 located in the fourth sub-pixel SPX4. Accordingly, when each fourth emission area EMA4 has a rhombic shape, the first opening OPN1 may have a rhombic shape. When each fourth emission area EMA4 has a circular shape, the first opening OPN1 may have a circular shape. In addition, since the second opening OPN2 of the second light blocking pattern LBP2 corresponds to the first opening OPN1 of the first light blocking pattern LBP1, the second opening OPN2 may have a shape identical to that of the first opening OPN1.

In an embodiment of the present disclosure, each of the first, second, third, and fourth emission areas EMA1, EMA2, EMA3, and EMA4 may have a size smaller than that of the emission area EMA of each of the fifth to eighth sub-pixels SPX5 to SPX8 due to the first and second light blocking patterns LBP1 and LBP2. Accordingly, the first pixel PXL1 may display an image having a viewing angle relatively smaller than that of the second pixel PXL2.

As described above, when the light blocking pattern LBP having a double-layer structure including the first light blocking pattern LBP1 and the second light blocking pattern LBP2, which are located in different layers, are configured with different materials, and have the same planar shape, is provided in the touch sensor TS to correspond to only the first pixel PXL1, each first pixel PXL1 has a viewing angle relatively narrower than that of each second pixel PXL2, thereby more easily implementing the private mode. Further, since the second light blocking pattern LBP2 is located under the first light blocking pattern LBP1, the second light blocking pattern LBP2 absorbs additional light that may not be blocked by the first light blocking pattern LBP1, thereby further preventing personal information from being emitted to the outside and potentially viewed by someone other than the user. As a consequence, characteristics (e.g., protection of private life of a person, protection of information, and the like) required in the private mode can be further maximized.

In the above-described embodiment, it has been described that the light blocking pattern LBP is configured in a double-layer structure including the first light blocking pattern LBP1 and the second light blocking pattern LBP2, but the present disclosure is not limited thereto. In some embodiments of the present disclosure, the light blocking pattern LBP may be configured in a multi-layer structure by further including additional light blocking patterns in addition to the above-described first and second light blocking patterns LBP1 and LBP2.

Hereinafter, an embodiment of the present disclosure in which the light blocking pattern LBP is configured in a multi-layer structure will be described with reference to FIGS. 15 to 17.

Figure 15:
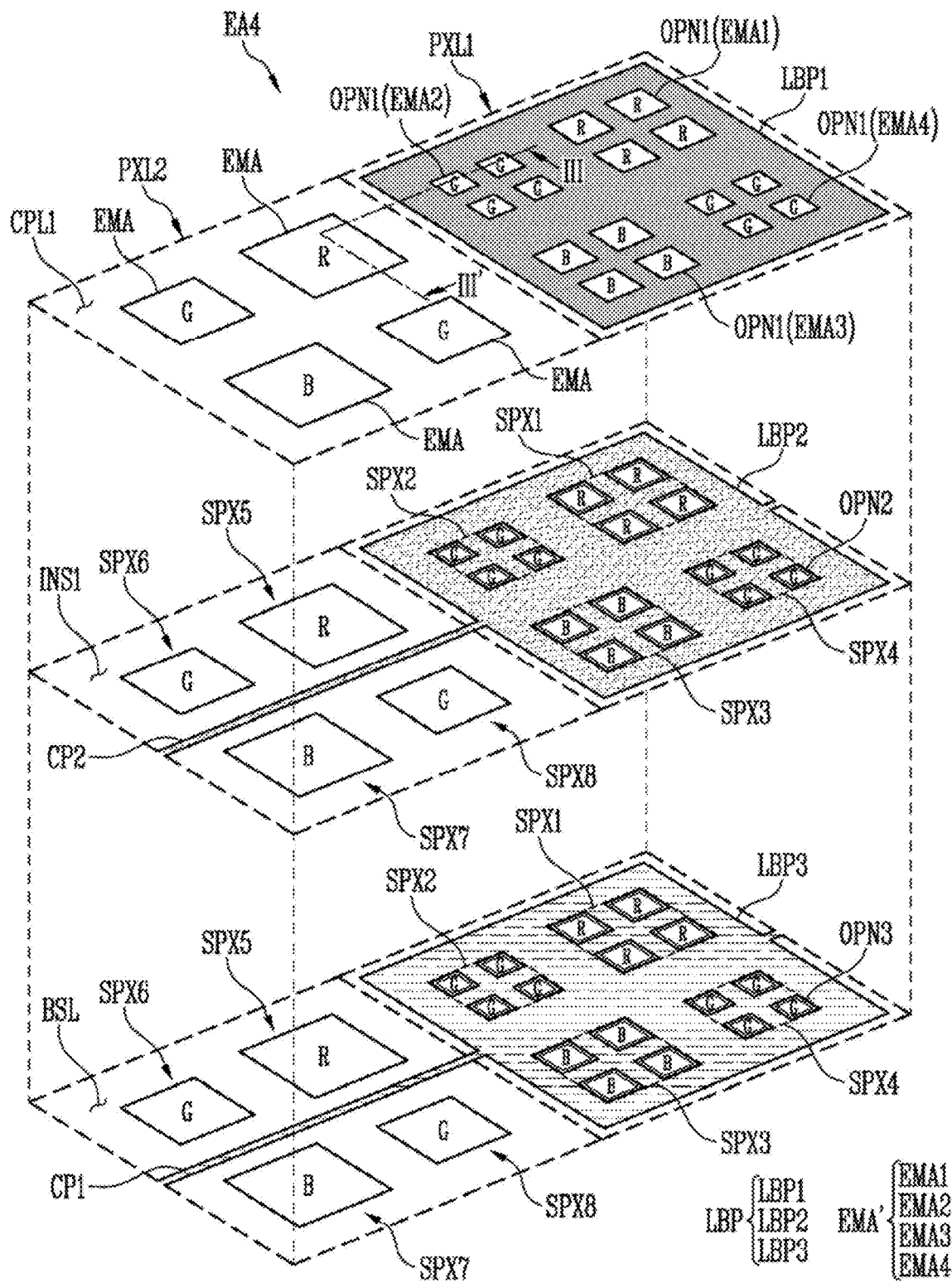
FIGS. 15 and 16 illustrate a first pixel including a third light blocking pattern and a second pixel adjacent thereto, and are perspective views corresponding to the portion EA4 shown in FIG. 11.
Figure 16:
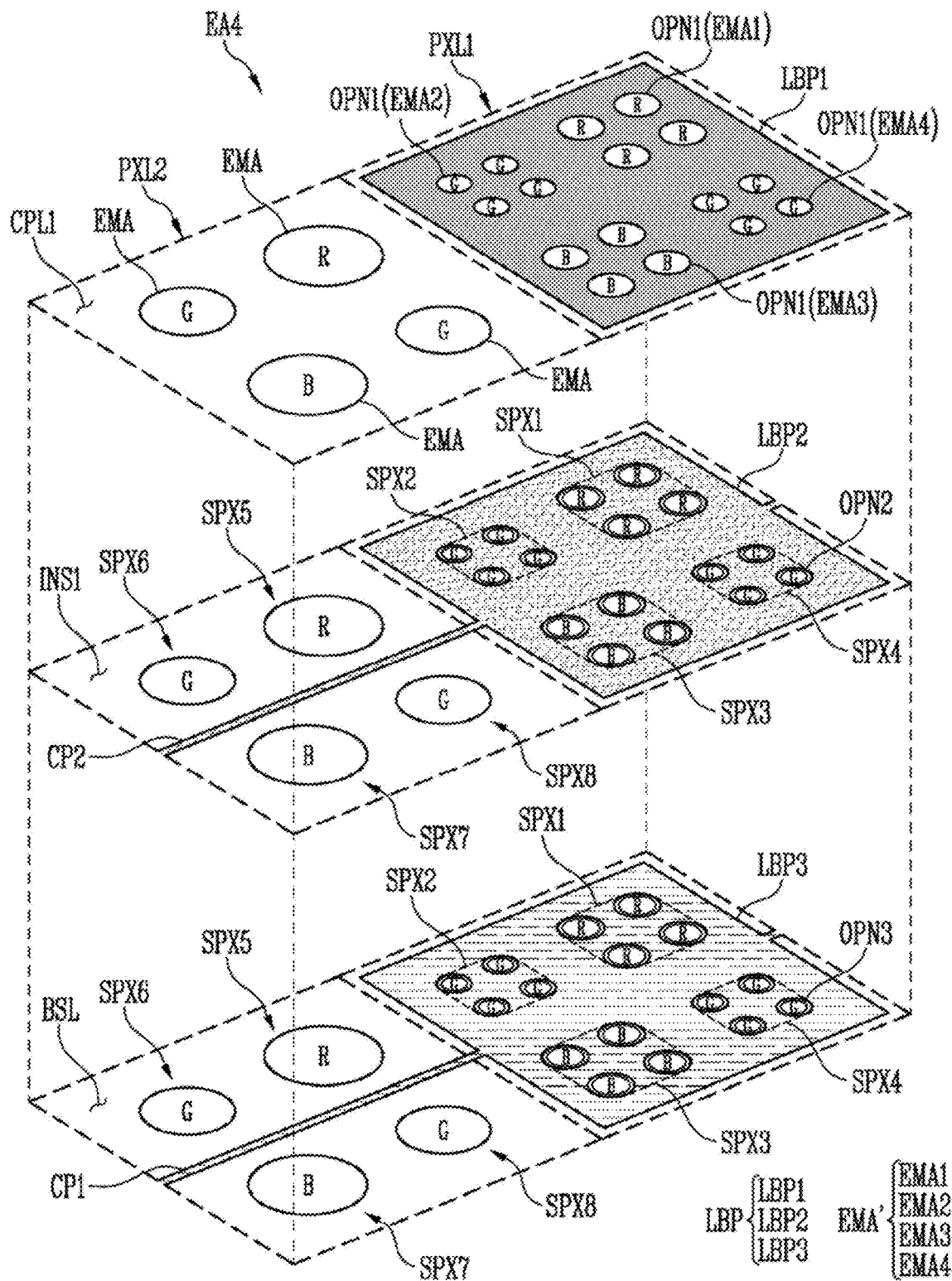

FIGS. 15 and 16 illustrate a first pixel PXL1 including a third light blocking pattern LBP3 and a second pixel PXL2 adjacent thereto, and are perspective views corresponding to the portion EA4 shown in FIG. 11. FIG. 17 is a cross-sectional view taken along line III-III' shown in FIG. 15.

Figure 17:
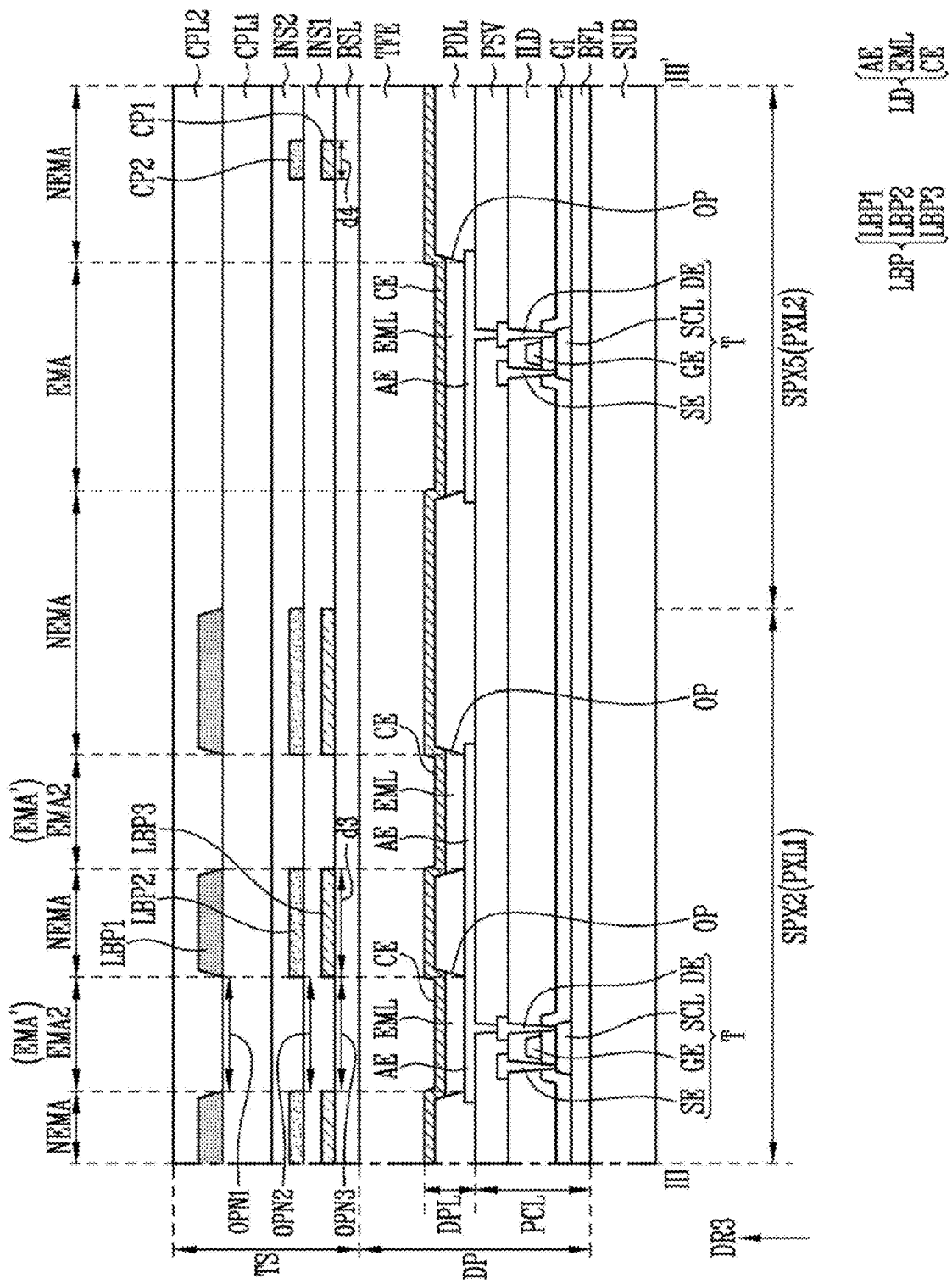
FIG. 17 is a cross-sectional view taken along line. III-III' shown in FIG. 15.

In FIGS. 15 to 17, the first pixel PXL1 and the second pixel PXL2 may be configured substantially identically or similarly to the first and second pixels PXL1 and PXL2 shown in FIGS. 12A to 14, except that the third light blocking pattern LBP3 is disposed in the first pixel PXL1 and a first conductive pattern CP1 is disposed in the second pixel PXL2.

In relation to the embodiment shown in FIGS. 15 to 17, portions different from those of the above-described embodiment will be mainly described to avoid redundancy.

Referring to FIGS. 1 to 11 and 15 to 17, a first light blocking pattern LBP1 may be disposed on a first capping layer CPL1 of the first pixel PXL1. The first light blocking pattern LBP1 may be located on one surface of the first capping layer CPL1 to correspond to a pixel defining layer PDL of the first pixel PXL1. The first light blocking pattern LBP1 may include a black matrix.

The first light blocking pattern LBP1 may include a plurality of first openings OPN1 corresponding to one area of an emission area EMA' in a first pixel area PXA1.

A second light blocking pattern LBP2 may be located under the first light blocking pattern LBP1. In an example, the second light blocking pattern LBP2 may be located on a first insulating layer INS1 of the first pixel PXL1, and correspond to the first light blocking pattern LBP1. The second light blocking pattern LBP2 may be configured as a second conductive pattern CP2, and be connected to a second conductive pattern CP2 of the second pixel PXL2.

The second light blocking pattern LBP2 may include a plurality of second openings OPN2 corresponding to one area of the emission area EMA' in the first pixel area PXA1. Each second opening OPN2 may correspond to each first opening OPN1.

In an embodiment of the present disclosure, the third light blocking pattern LBP3 may be located under the second light blocking pattern LBP2. In an example, the third light blocking pattern LBP3 may be located on a base layer BSL of the first pixel PXL1, and correspond to the second light blocking pattern LBP2. The third light blocking pattern LBP3 is not disposed in the second pixel PXL2. In other words, the third light blocking pattern LBP3 may only be disposed on the first pixel PXL1. In an example, the third light blocking pattern LBP3 may be located on one surface of the base layer BSL to correspond to the pixel defining layer PDL of the first pixel PXL1. Accordingly, the pixel defining layer PDL, the first light blocking pattern LBP1, the second light blocking pattern LBP2, and the third light blocking pattern LBP3 may correspond to each other.

The third light blocking pattern LBP3 may reflect or shield (or block) light emitted in an area between adjacent sub-pixels. To accomplish this, the third light blocking pattern LBP3 may include a conductive material having a constant reflexibility. The third light blocking pattern LBP3 may include at least one reflective electrode layer.

In some embodiments of the present disclosure, the third light blocking pattern LBP3 may be configured as the first conductive pattern CP1. The third light blocking pattern LBP3 may be provided in the same layer as the first conductive pattern CP1 (e.g., a first bridge pattern BRP1) located on a base layer BSL of the second pixel PXL2. The third light blocking pattern LBP3 may be connected to the first conductive pattern CP1 located on the base layer BSL of the second pixel PXL2 while being in contact with the first conductive pattern CP1. The third light blocking pattern LBP3 may be used as a touch electrode which recognizes a touch of a user, and simultaneously, be used as a light control member which narrows the viewing angle of the first pixel PXL1 by blocking a portion of light emitted from each of first to fourth sub-pixels SPX1 to SPX4 and allowing the other light to advance in only a specific direction.

In an embodiment of the present disclosure, the third light blocking pattern LBP3 may have a width (e.g., a critical dimension (CD), 'a line width of each electrode or a width of a gap between electrodes') different from that of the first conductive pattern CP1 of the second pixel PXL2. In an example, a width d3 of the third light blocking pattern LBP3 located between two third openings OPN3 may be greater than a width d4 of the first conductive pattern CP1 of the second pixel PXL2.

The third light blocking pattern LBP3 and the second light blocking pattern LBP2 may face each other in the third direction DR3 with the first insulating layer INS1 interposed therebetween. The third light blocking pattern LBP3 and the second light blocking pattern LBP2 may be separate components which are not connected to each other.

The third light blocking pattern LBP3 may be partially opened to include at least one third opening OPN3 corresponding to one area of the emission area EMA' in the first pixel area PXA1. In an example, the third light blocking pattern LBP3 may include a plurality of third openings OPN3. The third openings OPN3 may correspond to an opening OP of the pixel defining layer PDL. In addition, the third openings OPN3 may correspond to the second openings OPN2 of the second light blocking pattern LBP2. In addition, the third openings OPN3 may correspond to the first openings OPN1 of the first light blocking pattern LBP1. The third light blocking pattern LBP3 may have a mesh shape (or grid shape) including the third openings OPN3 in the first pixel area PXA1.

In the above-described embodiment, the first light blocking pattern LBP1, the second light blocking pattern LBP2, and the third light blocking pattern LBP3 may have the same planar shapes in the first pixel area PXA1 or have planar shapes substantially similar to each other in the first pixel area PXA1.

The third light blocking pattern LBP3 along with the first light blocking pattern LBP1 and the second light blocking pattern LBP2 may constitute a light blocking pattern LBP which allows the viewing angle of the first pixel PXL1 to become narrow.

In an embodiment of the present disclosure, each first emission area EMA1 may correspond to the first opening OPN1 of the first light blocking pattern LBP1, the second opening OPN2 of the second light blocking pattern LBP2, and the third opening OPN3 of the third light blocking pattern LBP3, which are located in the first sub-pixel SPX1. Accordingly, when each first emission area EMA1 has a rhombic shape as shown in FIG. 15, the first opening OPN1, the second opening OPN2, and the third opening OPN3 may have a rhombic shape. When each first emission area EMA1 has a circular shape as shown in FIG. 16, the first opening OPN1, the second opening OPN2, and the third opening OPN3 may have a circular shape.

In an embodiment of the present disclosure, each second emission area EMA2 may correspond to the first opening OPN1 of the first light blocking pattern LBP1, the second opening OPN2 of the second light blocking pattern LBP2, and the third opening OPN3 of the third light blocking pattern LBP3, which are located in the second sub-pixel SPX2. Accordingly, when each second emission area EMA2 has a rhombic shape as shown in FIG. 15, the first opening OPN1, the second opening OPN2, and the third opening OPN3 may have a rhombic shape. When each second emission area EMA2 has a circular shape as shown in FIG. 16, the first opening OPN1, the second opening OPN2, and the third opening OPN3 may have a circular shape.

In an embodiment of the present disclosure, each third emission area EMA3 may correspond to the first opening OPN1 of the first light blocking pattern LBP1, the second opening OPN2 of the second light blocking pattern LBP2, and the third opening OPN3 of the third light blocking pattern LBP3, which are located in the third sub-pixel SPX3. Accordingly, when each third emission area EMA3 has a rhombic shape as shown in FIG. 15, the first opening OPN1, the second opening OPN2, and the third opening OPN3 may have a rhombic shape. When each third emission area EMA3 has a circular shape as shown in FIG. 16, the first opening OPN1, the second opening OPN2, and the third opening OPN3 may have a circular shape.

In an embodiment of the present disclosure, each fourth emission area EMA4 may correspond to the first opening OPN1 of the first light blocking pattern LBP1, the second opening OPN2 of the second light blocking pattern LBP2, and the third opening OPN3 of the third light blocking pattern LBP3, which are located in the fourth sub-pixel SPX4. Accordingly, when each fourth emission area EMA4 has a rhombic shape as shown in FIG. 15, the first opening OPN1, the second opening OPN2, and the third opening OPN3 may have a rhombic shape. When each fourth emission area EMA4 has a circular shape as shown in FIG. 16, the first opening OPN1, the second opening OPN2, and the third opening OPN3 may have a circular shape.

In an embodiment of the present disclosure, each of the first, second, third, and fourth emission areas EMA1, EMA2, EMA3, and EMA4 may have a size smaller than that of an emission area EMA of each of fifth to eighth sub-pixels SPX5 to SPX8 due to the first and second light blocking patterns LBP1 and LBP2. Accordingly, the first pixel PXL1 may display an image having a viewing angle relatively smaller than that of the second pixel PXL2.

As described above, when the light blocking pattern LBP having a multi-layer structure including the first light blocking pattern LBP1, the second light blocking pattern LBP2, and the third light blocking pattern LBP3, which are located in different layers, are configured with different materials, and have the same planar shape, is provided in the touch sensor TS to correspond to only the first pixel PXL1, each first pixel PXL1 has a viewing angle relatively narrower than that of each second pixel PXL2, thereby more easily implementing the private mode. Further, since the third light blocking pattern LBP3 is located under the second light blocking pattern LBP2, the third light blocking pattern LBP3 absorbs additional light that may not be blocked by the first and second light blocking patterns LBP1 and LBP2, thereby preventing personal information from being emitted to the outside and potentially viewed by someone other than the user. As a consequence, characteristics (e.g., protection of private life of a person, protection of information, and the like) required in the private mode can be further maximized.

In accordance with an embodiment of the present disclosure, a conductive pattern having the same planar shape as a black matrix is disposed in a first pixel (or narrow pixel) independently driven when the private mode is set. In addition, the conductive pattern along with the black matrix is used as a light blocking pattern. Thus, characteristics of the private mode can be further maximized.

Example embodiments of the present disclosure have been disclosed herein, and although specific terms are employed, they are used and are to be interpreted in a generic and descriptive sense and not for purpose of limitation. In some instances, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in for and details may be made without departing from the spirit and scope of the present disclosure as set forth in the fallowing claims.

What is claimed is:

1. A display device, comprising:
a display panel including first pixels and second pixels, wherein the first pixels and the second pixels are provided on a substrate; and
a touch sensor disposed on the display panel,
wherein the touch sensor includes:
sensor patterns disposed on the display panel;
bridge patterns electrically connected to the sensor patterns;
a first light blocking pattern disposed on the sensor patterns, wherein the first light blocking pattern is provided for each of the first pixels, the first light blocking pattern including a first opening corresponding to an emission area of each of the first pixels; and
a second light blocking pattern located under the first light blocking pattern, wherein the second light blocking pattern is provided for each of the first pixels, the second light blocking pattern including a second opening to correspond to the emission area of each of the first pixels, and
wherein the first light blocking pattern and the second light blocking pattern have the same planar shape on each of the first pixels.

2. The display device of claim 1, wherein the first light blocking pattern and the second light blocking pattern include different materials.

3. The display device of claim 2, wherein the first light blocking pattern includes a black matrix, and the second light blocking pattern includes a conductive material.

4. The display device of claim 3, wherein the second light blocking pattern is electrically connected to at least one sensor pattern located on the second pixels.

5. The display device of claim 4, wherein each of the first pixels includes at least one first sub-pixel,
wherein the first sub-pixel includes a first electrode disposed on the substrate, a pixel defining layer including an opening exposing an area of the first electrode, a first emitting layer disposed on the area of the first electrode, and a second electrode disposed on the first emitting layer, and
wherein the first sub-pixel includes four emission areas.

6. The display device of claim 5, wherein the opening of the pixel defining layer, the first opening of the first light blocking pattern, and the second opening of the second light blocking pattern overlap each other.

7. The display device of claim 5, wherein each of the second pixels includes at least one second sub-pixel,
wherein the second sub-pixel includes a third electrode disposed on the substrate, the pixel defining layer including an opening exposing an area of the third electrode, a second emitting layer disposed on the area of the third electrode, and a fourth electrode disposed on the second emitting layer, and
wherein the second sub-pixel includes one emission area.

8. The display device of claim 7, wherein the first sub-pixel and the second sub-pixel have different sizes.

9. The display device of claim 8, wherein, when viewed on a plane, the four emission areas of the first sub-pixel and the one emission area of the second sub-pixel include a rhombic shape or a circular shape.

10. The display device of claim 7, wherein each of the first sub-pixel and the second sub-pixel includes a pixel circuit layer disposed on the substrate, the pixel circuit layer including at least one transistor.

11. The display device of claim 5, wherein the touch sensor includes:
a base layer located on the display panel;
a first conductive pattern located on the base layer;
a first insulating layer disposed on the first conductive pattern and the base layer;
a second conductive pattern located on the first insulating layer;
a second insulating layer disposed on the second conductive pattern and the first insulating layer; and
a capping layer disposed on the second insulating layer, wherein the first light blocking pattern is disposed on the capping layer.

12. The display device of claim 11, wherein the sensor patterns include first sensor patterns arranged along a first direction and second sensor patterns arranged along a second direction intersecting the first direction,
  wherein the bridge patterns include first bridge patterns connecting the first sensor patterns to each other and second bridge patterns connecting the second sensor patterns to each other, and
  wherein the first conductive pattern includes the first bridge patterns, and
  the second conductive pattern includes the first sensor patterns, the second sensor patterns, and the second bridge patterns.

13. The display device of claim 12, wherein the second light blocking pattern is provided in the same layer as the first sensor patterns, the second sensor patterns, and the second bridge patterns.

14. The display device of claim 13, wherein the second light blocking patterns have a width greater than that of the at least one sensor pattern located on each of the second pixels.

15. The display device of claim 14, wherein the touch sensor further includes a third light blocking pattern located under the second light blocking pattern, wherein the third light blocking pattern is provided for each of the first pixels, the third light blocking pattern including a third opening corresponding to the emission area of each of the first pixels.

16. The display device of claim 15, wherein the first light blocking pattern, the second light blocking pattern, and the third light blocking pattern have the same planar shape on each of the first pixels.

17. The display device of claim 15, wherein the third light blocking pattern includes a conductive material.

18. The display device of claim 17, wherein the third light blocking pattern is provided in the same layer as the first bridge patterns.

19. The display device of claim 15, wherein the opening of the pixel defining layer, the first opening of the first light blocking pattern, the second opening of the second light blocking pattern, and the third opening of the third light blocking pattern overlap each other.

20. A display device, comprising:
  a display panel including first pixels and second pixels; and
  a touch sensor disposed on the display panel,
  wherein the touch sensor includes:
  sensor patterns disposed on the display panel;
  bridge patterns electrically connected to the sensor patterns;
  a first light blocking pattern disposed on the sensor patterns, wherein the first light blocking pattern is provided for each of the first pixels, the first light blocking pattern including a first opening corresponding to an emission area of each of the first pixels;
  a second light blocking pattern overlapped by the first light blocking pattern, wherein the second light blocking pattern is provided for each of the first pixels, the second light blocking pattern including a second opening corresponding to the first opening; and
  a third light blocking pattern overlapped by the second light blocking pattern, wherein the third light blocking patter is provided for each of the first pixels, the third light blocking pattern including a third opening corresponding to the second opening,
  wherein the first light blocking pattern, the second light blocking pattern, and the third light blocking pattern have the same planar shape on each of the first pixels.

* * * * *